US007457518B2

(12) United States Patent
Nagasawa

(10) Patent No.: US 7,457,518 B2
(45) Date of Patent: *Nov. 25, 2008

(54) SPECIALLY FORMATTED OPTICAL DISK AND METHOD OF PLAYBACK

(75) Inventor: Masato Nagasawa, Nagaokakyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 360 days.

This patent is subject to a terminal disclaimer.

(21) Appl. No.: 10/997,967

(22) Filed: Nov. 29, 2004

(65) Prior Publication Data

US 2005/0094974 A1 May 5, 2005

Related U.S. Application Data

(62) Division of application No. 10/431,543, filed on May 8, 2003, now Pat. No. 6,842,578, which is a division of application No. 09/847,307, filed on May 3, 2001, now Pat. No. 6,771,884, which is a division of application No. 09/715,163, filed on Nov. 20, 2000, now Pat. No. 6,334,021, which is a division of application No. 09/108,798, filed on Jul. 1, 1998, now Pat. No. 6,167,190, which is a division of application No. 08/492,997, filed on Jun. 21, 1995, now Pat. No. 5,809,201.

(30) Foreign Application Priority Data

Jun. 24, 1994 (JP) .................................. 6-143411
Aug. 8, 1994 (JP) .................................. 6-186035

(51) Int. Cl.
*H04N 5/91* (2006.01)

(52) U.S. Cl. ......................... 386/68; 386/111; 386/126

(58) Field of Classification Search ............... 386/46, 386/68, 70, 95, 98, 111, 112, 125, 126
See application file for complete search history.

(56) References Cited

U.S. PATENT DOCUMENTS 4,931,879 A 6/1990 Koga et al.
4,985,784 A 1/1991 Tsuboi et al.
5,212,742 A 5/1993 Normile et al.

(Continued)

FOREIGN PATENT DOCUMENTS

EP 0396285 11/1990

(Continued)

OTHER PUBLICATIONS

Jan van der Meer, The Full Motion System for Cd-1, Nov. 1992, IEEE Transaction on Consumer Electronics, pp. 910-920.

(Continued)

*Primary Examiner*—Huy T Nguyen
(74) *Attorney, Agent, or Firm*—Birch, Stewart, Kolasch & Birch, LLP

(57) ABSTRACT

In an optical disk storing digital image information in the form of a succession of blocks, each comprising a plurality of frames comprising I-, P- and B-pictures, wherein an address format is preformatted in front of the block of image information of said plurality of frames, and the data arrangement within each image information blocks is such that I- and P-pictures are collectively disposed. The position of the I-pictures within each block is shifted from one block to another. The I-picture data may be divided into fraction according to the position on the screen, the DCT frequency, or layering, and the fractional I-picture data may be arranged in the image information blocks, and a header or parity signal is recorded in front of each fractional I-picture data. With such a configuration, it is possible to increase the speed of fast playback, and realize smooth playback picture.

7 Claims, 34 Drawing Sheets

U.S. PATENT DOCUMENTS

| | | | |
|---|---|---|---|
| 5,270,828 | A | 12/1993 | Mogi |
| 5,375,111 | A | 12/1994 | Ishida et al. |
| 5,535,008 | A | 7/1996 | Yamagishi et al. |
| 5,557,331 | A | 9/1996 | Honjo |
| 5,602,956 | A | 2/1997 | Suzuki et al. |
| 5,614,960 | A | 3/1997 | Chiba et al. |
| 5,809,201 | A | 9/1998 | Nagasawa |
| 5,991,502 | A | 11/1999 | Kawakami et al. |
| 6,141,491 | A * | 10/2000 | Yamagishi et al. .......... 386/109 |

FOREIGN PATENT DOCUMENTS

| | | |
|---|---|---|
| EP | 0536630 | 4/1993 |
| EP | 0545323 | 6/1993 |
| EP | 0579514 | 1/1994 |
| EP | 0596423 A2 | 5/1994 |
| JP | 03-066272 A | 3/1991 |
| JP | 03-074982 A | 3/1991 |
| JP | 04-072976 A | 3/1992 |
| JP | 04-079681 A | 3/1992 |
| JP | 4-114369 | 4/1992 |
| JP | 05-030454 A | 2/1993 |
| JP | 05-128810 A | 5/1993 |
| JP | 05-276491 A | 10/1993 |
| JP | 06-76482 A | 3/1994 |
| JP | 06-149902 A | 5/1994 |
| JP | 06-164522 A | 6/1994 |
| JP | 06-165114 A | 6/1994 |
| JP | 6-178265 | 6/1994 |
| JP | 06-217251 A | 8/1994 |
| JP | 06-252876 A | 9/1994 |
| JP | 06-261285 A | 9/1994 |
| JP | 06-261303 A | 9/1994 |
| JP | 06-339133 A | 12/1994 |
| JP | 07-123359 A | 5/1995 |
| JP | 07-193785 A | 7/1995 |
| JP | 07-212768 A | 8/1995 |

OTHER PUBLICATIONS

A. Puri, Invited Address: Video Coding Using the MPEG-1 Compression Standard, May 17, 1992 SID International Symposium Digest of Technical Papers, pp. 36/92.

"The Coding Technique for Motion Pictures for Storage Media," Yamada, Yasuhiro UEDA, Motoharu Television, Academic Journal vol. 45, No. 7, pp. 897-812.

* cited by examiner

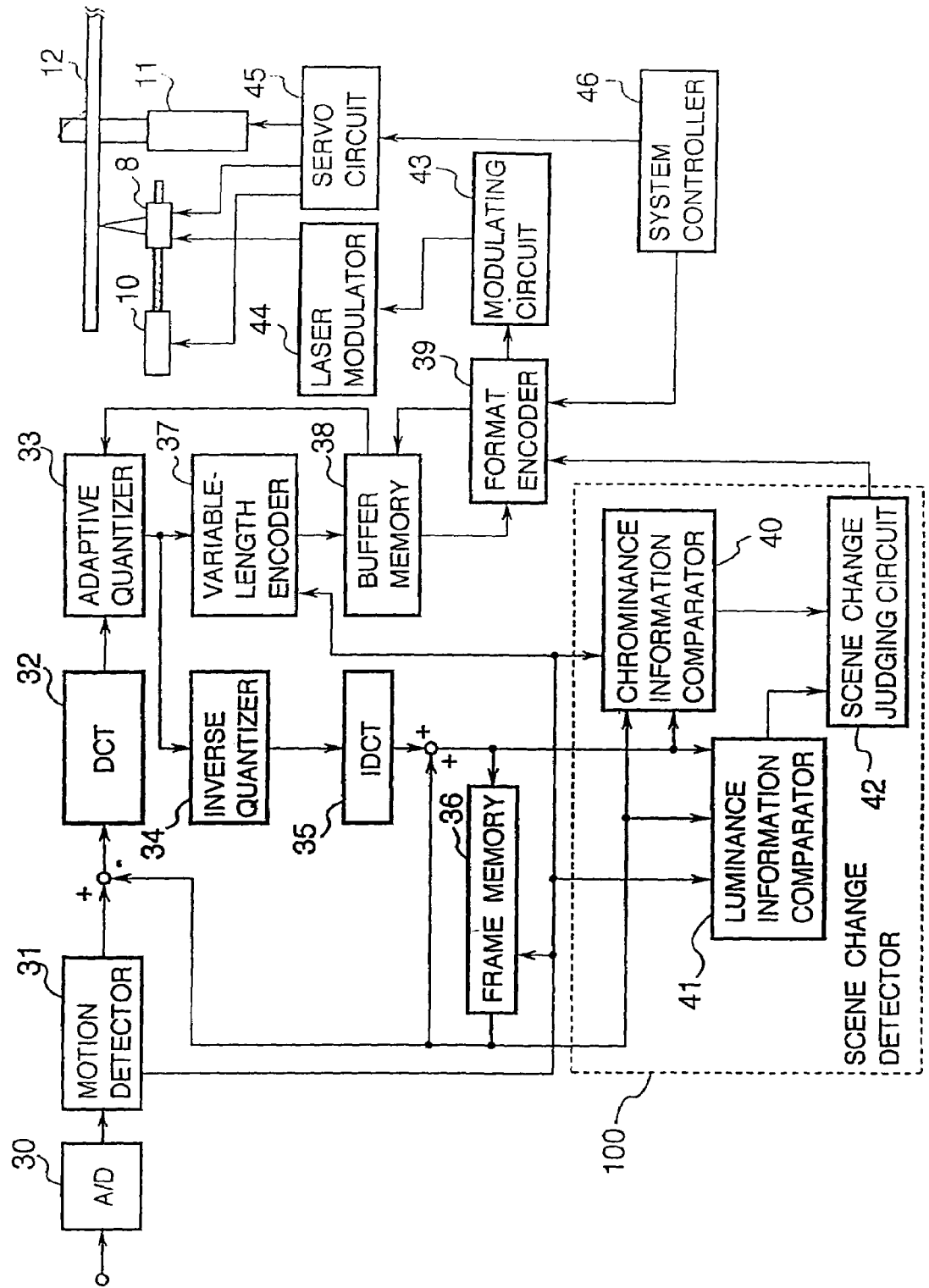

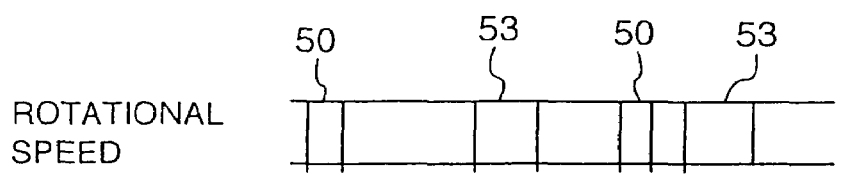
FIG. 3A ROTATIONAL SPEED
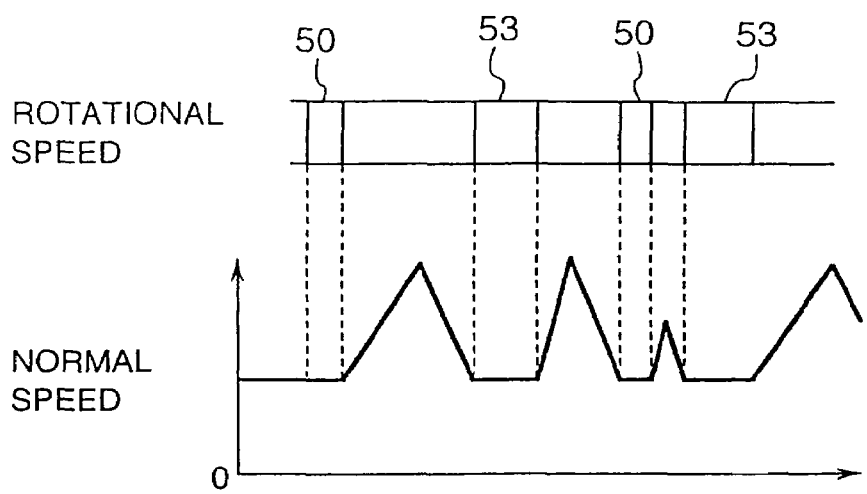
FIG. 3B NORMAL SPEED

SPECIALLY FORMATTED OPTICAL DISK AND METHOD OF PLAYBACK

This application is a Divisional of application Ser. No. 10/431,543, filed May 8, 2003, now U.S. Pat. No. 6,842,578 which is a Divisional of prior application Ser. No. 09/847,307 filed May 3, 2001 and issued as U.S. Pat. No. 6,771,884 on Aug. 3, 2004, which is a Divisional of prior application Ser. No. 09/715,163 filed Nov. 20, 2000 and issued as U.S. Pat. No. 6,334,021 on Dec. 25, 2001, which is a Divisional of prior application Ser. No. 09/108,798 filed Jul. 1, 1998 and issued as U.S. Pat. No. 6,167,190 on Dec. 26, 2000, which is a Divisional of prior application Ser. No. 08/492,997 filed Jun. 21, 1995, and issued as U.S. Pat. No. 5,809,201 on Sep. 15, 1998, and for which priority is claimed under 35 U.S.C. § 120; and this application claims priority of Application Nos. 6-143411 filed in Japan on Jun. 24, 1994, and 6-186035 filed in Japan on Aug. 8, 1994, under 35 U.S.C. § 119; the entire contents of all are hereby incorporated by reference.

BACKGROUND OF THE INVENTION

The present invention relates to an optical disk and a method of playing back from an optical disk.

FIG. 29 is a block diagram showing a conventional optical disk recording/playback device shown in Japanese Patent Kokai Publication 114369/1992. An A/D converter 1 converts a video signal, an audio signal or the like into digital information. An information compressing means 2 serves to compress the output of the A/D converter 1. A frame sector converting means 3 converts the compressed information into sector information equal in length to a multiple of the frame period. An encoder 4 encodes the output of the frame sector converting means 3. A modulator 5 modulates the output of the encoder 4 into predefined modulated codes so as to reduce interference between codes on the recording medium. A laser driver 6 is for modulating the laser light in accordance with the modulated codes. A laser output switch 7 is driven by the laser driver 6 to vary the current supplied to the laser in an optical head 8, for emitting laser light.

An actuator 9 is for tracking the emitted light beam. A traverse or feed motor 10 is for moving the optical head 8 in the radial direction of a disk 12 which can record information by magneto-optical recording or phase-change recording.

A disk motor 11 is driven by a motor driver 19 to rotate the disk 12. The motor drivers 19 are controlled by first and second motor controllers 20. A playback amplifier 13 amplifies the playback signal from the optical head 8. A demodulator 14 demodulates the amplified playback signal to obtain data from the recorded, modulated signal. A decoder 15 decodes the demodulated signal, and a frame sector inverse conversion means 16 performs frame sector inverse conversion to restore original image data with the addresses and parities having been removed. An information expanding means 17 expands the compressed information, and a D/A converter 18 converts the expanded information into an analog video or audio signal.

FIG. 30 shows, in a simplified form, the data arrangement structure (layer structure) of the Moving Picture Coding Experts Group (MPEG) system which is a standard method of transferring and storing compressed digital moving picture information. In FIG. 30, reference 21 denotes a group of pictures (hereinafter referred to as "GOPs") consisting of information of a plurality of frames, 22 denotes a GOP layer formed of several pictures (screens), 23 denotes slices into which each picture is divided, 24 denotes a slice layer formed of several macroblocks, 25 denotes a microblock layer, and 26 denotes a block layer formed of 8×8 pixels.

The microblock layer 25 is a block consisting of 8×8 pixels, which is the minimum unit of encoding in the MPEG system, and discrete cosine transform (hereinafter referred to as "DCT") is effected taking each micro block as a unit. Four adjacent Y signal blocks and one Cb block and one Cr block which correspond, with regard to position, to the four Y signal blocks, i.e., six blocks in all form a macroblock 24. Several macroblocks 24 form a slice 23. The macroblock 24 is a minimum unit for motion compensated prediction, and the motion vector for the motion compensated prediction are determined taking each macroblock 24 as a unit.

FIG. 31 a diagram showing the conventional encoding structure for the case where 17 pictures form one GOP. In FIG. 31 27 denotes an I-picture which is image information for which intra-frame DCT is effected, 29 denotes a P-picture which is image information for which forward motion-compensated DCT encoding is effected using the I-picture or another P-picture (P-picture other than the P-picture for which the forward motion-compensated DCT encoding is being effected) as a reference picture, 28 denotes a B-picture for which motion compensated DCT encoding is effected using the I-picture and/or P-pictures at preceding and succeeding positions, as reference pictures.

FIG. 32 is a diagram showing the conventional encoding structure for the case where 10 pictures form one GOP, and FIG. 33 is a diagram showing the conventional encoding structure for the case where 15 pictures form one GOP.

In the drawings, P-, B- and I-pictures are respectively represented as "P" or "P-picture," "B" or "B-picture," and "I" or "I-picture."

The operation will next be described with reference to the drawings. With the advancement in the digital image information compression technology, it is now possible to realize an image filing system which is very convenient to use, by recording the compressed information on a disk, with which search is much easier than having a VTR with a magnetic tape. Since, such disk file system handles digital information, there is no deterioration due to dubbing, and because recording and reproduction is achieved optically and there is no direct contact with the recording medium, reliability is high.

Conventionally, an optical disk recorder shown in FIG. 29 is used for recording the digital compressed motion information of the MPEG system shown in FIG. 30. The image information digitized by the A/D converter 1 is converted at the information compression means 2 into information of a standard compression picture system such as an MPEG system. The compressed information is encoded and modulated so that the effects of the interference between the codes on the disk is reduced, and is then recorded on a disk 12. By making the amount of data for each GOP substantially identical, and by dividing information into sectors having a length equal to a multiple of a frame period, editing and the like, treating each GOP as a unit, is possible.

During playback, the image information reproduced from the optical disk 12 is amplified by the playback amplifier 13, and returned into a digital data by the demodulator 14 and the decoder, and the original image data with the addresses and parities having been removed can be restored at the frame sector inverse conversion means 16. Furthermore, an image signal is restored by effecting, MPEG decoding, for example, at the information expanding means 17, and is then converted into an analog signal by the D/A converter 18 so that display on a monitor or the like is possible.

If the MPEG system is used as the digital motion compression method as described above, the encoding structure comprising one or more compressed I-pictures 27 by means of intra-frame DCT, one or more P-pictures 29 which is formed of image information obtained by DCT encoding with motion compensation in the forward direction, and one or more B-pictures 28 obtained by DCT encoding with motion compensation using I- and/or P-pictures positioned in front and at the back along the time axis, as reference pictures, as shown in FIG. 31 to FIG. 33.

Because an I-picture is obtained by intra-frame DCT, is possible to effect reproduction of the image with an I-picture independently. A P-picture, on the other hand, is obtained by forward motion compensation and the reproduction of the image with a P-picture is not effected until after the reproduction of the I-picture. Because the B-picture is obtained by prediction from both sides, both the I- and/or P-pictures must first be reproduced before the B-picture. The amount of data is the smallest and the efficiency of encoding is the best with the B-picture, because it is predicted in both directions.

Because the B-picture is not reproduced independently, it requires an I- or P-pictures, so that if the number of the B-pictures is increased, the capacity of the buffer memories must be increased, and the delay time from the data input to the image playback is lengthened. In a storage media, represented by optical disks or the like, an encoding method with a high compression efficiency is desired for long-time recording and the delay in the image playback is not problematical. Accordingly, the encoding system showing in FIG. 31 to FIG. 33 is appropriate for simple playback.

Now let us consider how the conventional image search and fast playback are effected from a disk receding data with the encoding structure as described above. If the encoding structure is as shown in FIG. 33, and if playback is made by extracting I-pictures, fast playback is possible. In this case, when an I-picture is reproduced, then a track jump is conducted to access the next or preceding GOP, and the I-picture therein is reproduced. By repeating such an operation, a fast forward or reverse playback is realized. The feed speed for fast forward or reverse playback is limited to the 15-time speed in case of FIG. 33, and 10-times in the case of FIG. 32.

In the actual image search, if the speed is too high, it is difficult for the human eyes to recognize the image. For rough recognition, the fast search at a 10-time or more speed is appropriate, but for search with regard to the details after the rough search, fast playback or reverse playback at several-time speed is necessary It is therefore necessary that special playback can be conducted over a wide range, of from several tens to several times the normal playback speed, to permit effective image search. Where the compressed data of the MPEG system is used, and if it is attempted to reproduce P-pictures in the encoding structure of FIG. 31 to FIG. 33, the B-pictures positioned before the P-pictures are also read, and it is therefore difficult to realize four to eight time speed.

Since the conventional playback method reproduce the encoding structure on the disk as it is, special playback can be achieved only by I-pictures, and fast forward and reverse playback can be achieved only at a speed which corresponds to the number of frames contained in one GOP or a multiple thereof.

Also, with the recording format of the digital image shown in connection with the prior art examples, I-pictures, P-pictures and B-pictures are arranged in a sequence along the time axis, so that the special playback is limited to the following method.

Particularly, a fundamental method for special playback in the system for recording digital motion picture image in the prior art performs special playback using information recorded in the TOC area which is at the inner periphery of the disk. In this case, special playback is achieved by reading, in accordance with the head address of the scene change (the address of a location where a picture immediately after the scene change is recorded) or the head address of the image file recorded in the TOC area, the digital motion picture image of the I-picture stored at the address, and reproducing them in turn.

The conventional operation for reading from the optical disk in such a method is shown in the flowchart of FIG. 34. This flowchart shows the case in which special playback is effected on the basis of the address at the head of the scene in the motion picture image information recorded in the TOC area. First, a jump is made to the TOC area, and the scene head address is stored in the internal memory, and then jump is made to the address that has been stored, and the I-picture in the GOP to which jump has been made is reproduced, and displayed, and movement to the next address of jump destination is made. Such a sequence of operation is repeated.

With such a conventional method, however, a large amount of addresses which should be searched for (and to which a jump is destined) need to be stored, and the TOC information must be rewritten each time a recording is made.

Moreover, during special playback in the conventional system, it is necessary to skip B-picture data for reproducing P-pictures, but as the I-pictures, B-pictures and P-pictures are recorded on the disk in sequence, waiting time may have to be spent before reproducing a P-picture when a track jump is conducted.

Furthermore, in the conventional system the amount of data of the I-picture encoded by intra-frame DCT is larger than the amount of data of P- or B-pictures, so that super-fast playback, of several tens times the normal playback speed, cannot be realized because the time for inputting data may be insufficient.

When starting a search in the conventional system for a desired GOP from an arbitrary position on the disk, the search operation must be repeated several times for finding the head of each GOP (at which time code or address of the image is recorded).

Furthermore, as the scene change position in the motion picture image information is not known, a scene-by-scene search for finding a scene cannot be achieved by using the conventional system.

In addition, because only part of the data in each GOP is read in the special playback, image playback may not be accomplished, or playback may be possible only with regard to part of the display screen in the conventional system.

SUMMARY OF THE INVENTION

An object of the invention is to increase the special playback speed.

Another object of the invention is to reduce rotation waiting time when a track jump is performed.

Another object of the invention is to enable continuous reproduction of I-pictures.

Another object of the invention is to reduce the capacity of memory for storing images during playback.

Another object of the invention is to facilitate locating the head position of each GOP.

Another object of the invention is to enable recording of information designating the manner of playback.

According to an aspect of the invention, there is provided an optical disk recording digital image information in the form of a succession of image information blocks, each comprising I-picture data of an I-picture obtained by intra-frame DCT encoding, P-picture data of one or more P-pictures obtained by DCT encoding with forward motion compensation, and B-picture data of B-pictures obtained by DCT encoding with motion compensation using the data of the I- and/or P-pictures positioned in front and at the back thereof as reference pictures, wherein an address format is preformatted in front of the block of image information of said plurality of frames, and the data arrangement within each image information blocks is such that I- and P-pictures are collectively disposed.

Since the I- and P-picture data are collectively disposed, that is, the I- and P-picture data within each GOP are disposed in succession, they are read in succession during normal playback are stored in a buffer memory, and then decoded, and B-picture data are thereafter read and decoded sequentially to restore image data within the GOP. The capacity of the buffer memory can be reduced. During special replay, only I-picture data are read and decoded, while track jump can be effected at the position where the P- or B-picture data is recorded. During special replay, the time for reproducing P- and B-picture data can be omitted, so that the special playback speed can be increased.

It may be so arranged that a parity signal or header signal for recognition is recorded at the head of the I-picture data.

With the above configuration, the position detection of the I- and P-picture data and discrimination between the I- and P-picture data during fast playback can be made with ease, and continuous reproduction of I-picture data is achieved without reproducing the management data at the head of the GOP at the time of track jump.

It may be so arranged that the order of data arrangement of the I- and P-picture data within each of the image information blocks is different from one image information block to another image information block.

The configuration in which the order of data arrangement of the I- and P-picture data within each of the image information blocks is different from one image information block to another image information block can be implemented by exchanging the positions of the I- and P-picture data between adjacent image information blocks. With the above configuration, rotation waiting time at the time of track jump can be reduced.

It may be so arranged that the I- and P-picture data within each image information block are disposed adjacent to each other, and the order of data arrangement of the I-, P- and B-picture data is different from one image information block to another image information block.

The configuration in which the order of data arrangement of the I-, P- and B-picture data is different from one image information block to another image information block can be implemented by exchanging the positions of the I-, P- and B-picture data between adjacent image information blocks. With the above configuration, the rotation waiting time at the time of track jump can be further reduced.

It may be so arranged that the area within the optical disk is divided into a plurality of zones for respective radius ranges, the scanning linear velocities in different zones being substantially equal to each other, address data and a header signal being preformatted at the head of each of the image information blocks, and the number of data bits for each of the image information blocks being identical between the image information blocks, and the data recording bit length of the image information block within each sector being a multiple of the circumferential length of the track on the disk.

That data recording bit length of the image information block within each sector being a multiple of the circumferential length of the track on the disk means the recording capacity per image information block (GOP) is a multiple of the recording capacity per revolution. With the above configuration, the variation in the linear velocity can be restrained within a sufficient range, and the GOP head positions can be recognized with ease wherever position on the disk is being scanned.

It may so arranged that a mirror-surface part for track offset detection is provided for each of the image information blocks.

With the above configuration, it is possible to recognize the GOP head positions by reference to the mirror-surface parts, and by setting the length of the mirror-surface part to be different from other parts,. the GOP head positions can be recognized from the sum signal at the optical head, without reproducing the data.

According to another aspect of the invention, there is provided an optical disk recording digital image information in the form of a succession of image information blocks, each comprising I-picture data of an I-picture obtained by intraframe DCT encoding, P-picture data of one or more P-pictures obtained by DCT encoding with forward motion compensation, and B-picture data of B-pictures obtained by DCT encoding with motion compensation using the data of the I- and/or P-pictures positioned in front and at the back thereof as reference pictures, wherein an address data preformatted in front of the respective image information blocks (or image files) are aligned on a straight line extending in the radial direction.

With the above configuration, wherever the light spot is tracing, the head position of each GOP can be recognized, and the track jump starting point can be defined accordingly According to another aspect of the invention, there is provided an optical disk recording digital image information in the form of a succession of image information blocks, each comprising I-picture data of an I-picture obtained by intraframe DCT encoding, P-picture data of one or more P-pictures obtained by DCT encoding with forward motion compensation, and B-picture data of B-pictures obtained by DCT encoding with motion compensation using the data of the I- and/or P-pictures positioned in front and at the back thereof as reference pictures, wherein a jump destination address for special playback is recorded in the attribute data recording area at the head of each of the image information blocks.

With the above configuration, special playback can be conducted in any of different modes depending on the contents of the motion picture, and the manner of special playback can be designated during recording, and by repeating the track jump using the above information, special playback in which motion picture scene is completed or continuous reproduction of only the scene head portions can be achieved.

According to another aspect of the invention, there is provided an optical disk recording digital image information in the form of a succession of image information blocks, each comprising I-picture data of an I-picture obtained by intraframe DCT encoding, P-picture data of one or more P-pictures obtained by DCT encoding with forward motion compensation, and B-picture data of B-pictures obtained by DCT encoding with motion compensation using the data of the I- and/or P-pictures positioned in front and at the back thereof as reference pictures, wherein presence/absence of scene change detected from the temporal change in the luminance or chrominance information of the image is recorded in the attribute data recording area at the head of each,h of the image information blocks.

With the above configuration, it is possible to conduct image search by sequentially reproducing the still pictures immediately succeeding or immediately preceding the scene changes, and it is possible to conduct editing taking each scene (partitioned by the scene changes) as a unit, i.e., on a scene-by-scene basis.

According to another aspect of the invention, there is provided a method of playing back an optical disk recording digital image information in the form of a succession of image information blocks, each comprising I-picture data of an I-picture obtained by intra-frame DCT encoding, P-picture data of one or more P-pictures obtained by DCT encoding with forward motion compensation, and B-picture data of B-pictures obtained by DCT encoding with motion compensation using said I- and/or P-pictures positioned in front and at the back thereof as reference pictures, wherein presence/absence of scene change detected from the temporal change in the luminance or chrominance information of the image is recorded in the attribute data recording area at the head of each of the image information blocks.

With the above configuration, it is possible to conduct image search by sequentially reproducing the still pictures immediately succeeding or immediately preceding the scene changes, and it is possible to conduct editing taking each scene (partitioned by the scene changes) as a unit, i.e., on a scene-by-scene basis.

According to another aspect of the invention, there is provided a method of playing back an optical disk recording digital image information in the form of a succession of image information blocks, each comprising I-picture data of an I-picture obtained by intra-frame DCT encoding, P-picture data of one or more P-pictures obtained by DCT encoding with forward motion compensation, and B-picture data of B-pictures obtained by DCT encoding with motion compensation using said I- and/or P-pictures positioned in front and at the back thereof as reference pictures, said method comprising the steps of:

using an optical head having a coarse actuator for accessing to a desired position, and a fine actuator for jumping to a desired track at the inner or outer periphery of the optical disk;

playing back the I-picture data through search and identification by reference to the parity signal or the header signal within the image information block on the optical disk;

reproducing the I-picture data in the next image information block; and repeating the above operations to perform fast playback or reverse playback.

With the above method, it is possible to reproduce I-pictures of the respective GOPs, by repeating track jump by referring to the parity or header signal at the head of each of the I-pictures.

According to another aspect of the invention, there is provided a method of playing back an optical disk recording digital image information in the form of a succession of image information blocks, each comprising I-picture data of an I-picture obtained by intra-frame DCT encoding, P-picture data of one or more P-pictures obtained by DCT encoding with forward motion compensation, and B-picture data of B-pictures obtained by DCT encoding with motion compensation using said I- and/or P-pictures positioned in front and at the back thereof as reference pictures, said method comprising the steps of:

using an optical head having a coarse actuator for accessing to a desired position, and a fine actuator for jumping to a desired track at the inner or outer periphery of the optical disk;

playing back the I-picture data through search and identification by reference to the parity signal or the header signal within the image information block on the optical disk;

then playing back the P-picture data of a plurality of P-pictures successively;

conducting a track jump;

reproducing the I-picture data in the next image information block;

then playing back the P-picture data of a plurality of P-pictures successively; and repeating the above operations to perform fast playback or reverse playback.

With the above method, the playback speed is improved.

According to another aspect of the invention, there is provided a method of playing back an optical disk wherein the rotational speed of the optical disk during fast playback or reverse playback of motion picture image is higher than the rotational speed of the optical disk during normal playback.

With the above method, the data transfer rate is improved.

According to another aspect of the invention, there is provided a method of playing back an optical disk wherein the rotational speed of the optical disk is raised in the region in which no data which need to be read during fast playback or reverse playback of a motion picture image is recorded, and is lowered to the linear velocity at which reproduction of data is possible, in the region in which I- and P-picture data is recorded.

With the above method, the overall playback speed is improved. It is also possible to achieve smooth fast special playback of motion picture image without using track jump.

According to another aspect of the invention, there is provided an optical disk recording digital image information in the form of a succession of image information blocks, each comprising I-picture data of an I-picture obtained by intra-frame DCT encoding, P-picture data of one or more P-pictures obtained by DCT encoding with forward motion compensation, and B-picture data of B-pictures obtained by DCT encoding with motion compensation using the data of the I- and/or P-pictures positioned in front and at the back thereof as reference pictures, wherein said I-picture data is divided into fractional I-picture data for a plurality of regions into which a display screen is divided, and the fractional I-picture data are arranged in said image information block, and a header or parity signal is recorded in front of each fractional I-picture data.

It may additionally be so arranged that the fractional I-picture data in the adjacent image information blocks in the adjacent recording tracks may be different.

With the above configuration, through search for a header signal or parity signal recorded in front of the screen fractional I-picture data, the screen fractional I-picture data can be sequentially reproduced.

The header or parity signal is recorded at the head of the data obtained by dividing I-picture data for the respective regions in the screen, so that when conducting a special playback in which only I-pictures in the respective GOPs are reproduced and joined, it is not necessary to read all the I-picture data.

Accordingly, the special playback speed multiplier is increased, and it is possible to obtain smooth continuous movement in the picture during the special playback.

According to another aspect of the invention, there is provided an optical disk in which DCT-encoded I-picture data is allocated into a plurality of sub-blocks according to the horizontal and vertical frequencies, from the DC components to the high-frequency components, sub-blocks of I-, P- and B-picture data in the adjacent image information blocks in the adjacent tracks are disposed with their order being altered, and a header or parity signal indicating which of the frequency components the content of each sub-block is for is recorded in front of each sub-block.

With the above configuration, the frequency-divided I-picture data of a desired low-frequency component can be arbitrarily accessed and sequentially reproduced by searching for the header or parity signal. As a result, is not necessary to read all the I-picture data if the resolution of the displayed picture may be sacrificed to a certain extent, and special playback speed multiplier is high and yet smoothly moving picture can be produced. Moreover, when zone CAV format disk is used, the rotation waiting time during special playback is reduced.

According to another aspect of the invention, there is provided an optical disk, in which DCT-encoded I-picture data is allocated into a plurality of sub-blocks according to the horizontal and vertical frequencies, from the DC components to the high-frequency components, the frequency-divided I-picture data within the adjacent image information blocks in the adjacent tracks are disposed differently, and a header or parity signal indicating which of the frequency components the content of each sub-block is for is recorded in front of each sub-block.

With the above configuration, it is possible to achieve high-speed fast playback or reverse playback of frequency-divided I-picture data by repeating track jump through search for the header signal or parity signal. That is, the frequency-divided I-picture data of a desired low-frequency component can be arbitrarily accessed and sequentially reproduced by searching for the header signal or parity signal. As a result, it is not necessary to read all the I-picture data if the resolution of the displayed picture may be sacrificed to a certain extent, and the special playback speed multiplier is high and yet smoothly moving picture can be displayed. Moreover, when zone CAV format disk is used, the rotation waiting time during special playback is reduced.

According to another aspect of the invention, there is provided an optical disk storing digital image information in the form of a succession of blocks, each comprising a plurality of frames comprising, in mixture, I-picture data forming image information obtained by intra-frame DCT encoding, P-picture data obtained by DCT encoding with forward motion compensation, and B-picture data obtained by DCT encoding with motion compensation using said I- and/or P-picture data positioned in front and at the back thereof as references, wherein the digital motion picture image information is divided into lower-layer data having smaller numbers of pixels and lines, and upper-layer data which produce, in combination with the lower-layer data, an image with larger numbers of pixels and lines, and a header or parity signal for indicating the type of the data block is recorded in front of each data block.

It may additionally be so arranged that the lower-layer data and the upper-layer data are disposed, with their order being altered.

With the above arrangement, the digital motion picture image information can be sequentially reproduced through search for the header or parity signal and arbitrarily accessing I-picture data of desired, small numbers of pixels and lines. Moreover, it is not necessary to read all the I-picture data during special playback and yet image can be reproduced, and it is therefore possible to increase the special playback speed multiplier.

It may be so arranged that the order of data arrangement of I-, P- and B-picture data within an image information block is different between adjacent image information blocks.

With the above configuration, it is possible to achieve high-speed fast playback or reverse playback of screen-divided I-picture data by repeating track jump through search for the header or parity signal recorded in front of each data.

It may be so arranged that identification signal indicating whether the I-picture data is a screen-divided data, a frequency-divided data, or data divided by the numbers of pixels and lines is written at the head of each image information block.

With the above configuration, it is possible to identify whether the recorded digital motion picture image information is of an I-picture data, frequency-divided data, screen-region-divided data, or pixel/line-number divided data by finding an identification signal written at the head of each image information block and identifying the content thereof, and it is possible to sequentially reproduce the recorded digital motion picture image information.

It may be so arranged that the head positions of the digital image information blocks are aligned in the radial direction of the optical disk.

With the above configuration, it is possible to accurately determine the timings of the track jump, and to continuously read special playback data without rotation waiting time.

According to another aspect of the invention, there is provided a method of playing back from an optical disk comprising the steps of:

using an optical disk playback device comprising a tracking actuator for tracking a scanning spot on a predefined track, a tracking control circuit, and a track jump circuit for performing jumping scanning, using an optical disk according to the descriptions above, and repeating jumping operation on the basis of a header or parity signal recorded in front of each I-picture data to perform high-speed playback or reverse playback.

With the above method, it is thereby possible to perform high-speed playback or reverse playback of divided digital image information.

According to another aspect of the invention, there is provided a method of playing back from an optical disk, comprising the steps of:

using an optical disk playback device comprising a tracking actuator for tracking a scanning spot on a predefined track, a tracking control circuit, and a track jump circuit for performing jumping scanning, using an optical disk according to the descriptions above, and repeating jumping operation on the basis of an identification signal written at the head of each is image information block to perform high-speed playback or reverse playback.

With the above method, it is possible to identify the type of the data of each image information block on the basis of an identification signal written at the head of each image information block, so that the digital image information can be reproduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a block diagram showing the recording system in Embodiment 1;

FIG. 3A and FIG. 3B are diagrams showing the variation of the disk rotational speed during fast playback of the image data in Embodiment 1;

DETAILED DESCRIPTION OF THE PREFERRED EMBODIMENTS

Embodiment 1

Figures 2A, 2B:
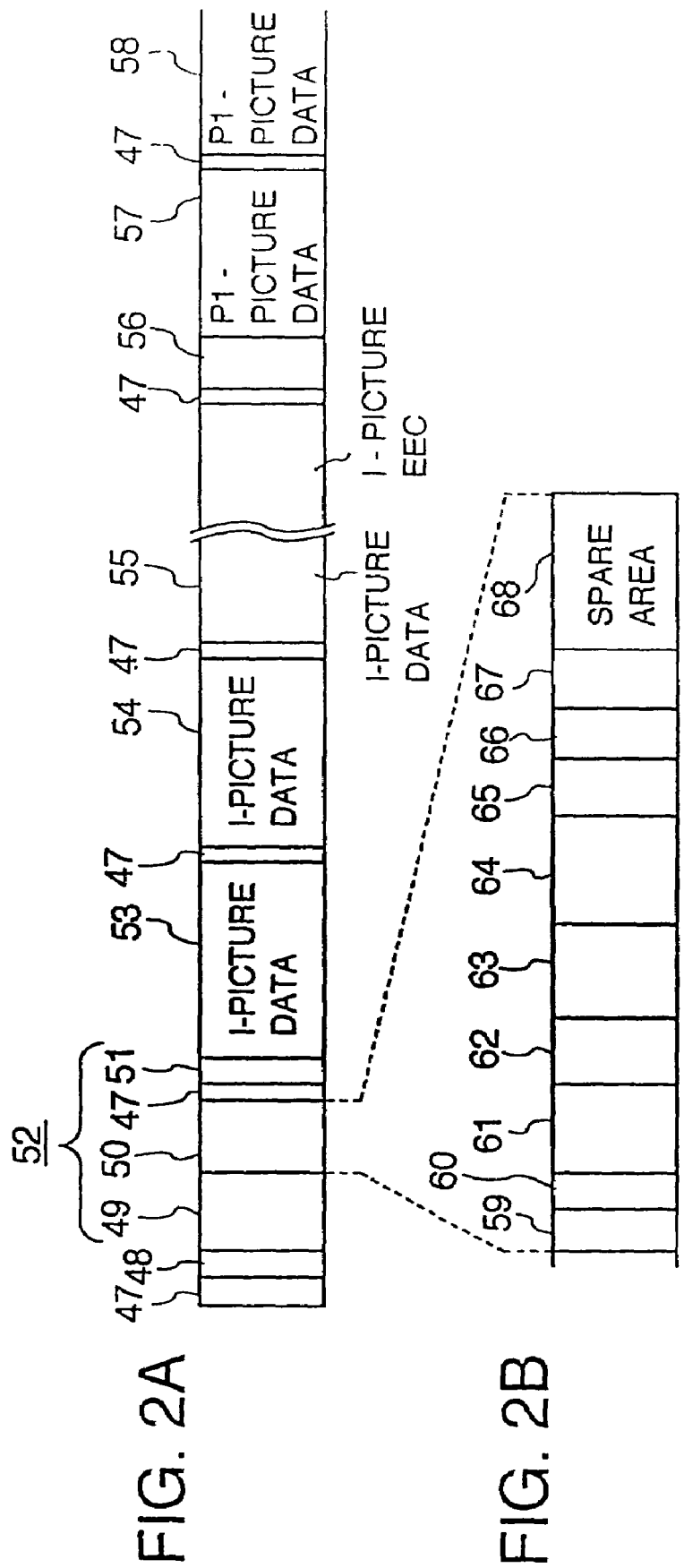
FIG. 2A and FIG. 2B are diagrams showing the digital motion picture image data recording format in Embodiment 1.

FIG. 1 is a block diagram showing a recording system of an optical disk device of Embodiment 1 of the present invention. In the drawing, an A/D converter 30 converts an analog video signal into a digital signal. A motion detector 31 detects the motion vector of the digital video signal. A discrete cosine transform circuit 32 divides the image information into horizontal and vertical spatial frequency components. Reference numeral 33 denotes an adaptive quantizer, and 34 denotes an inverse quantizer. An inverse discrete cosine transform circuit 35 restores the image information from the frequency components. A frame memory 36 stores the image information as reference images, on the basis of the motion vector, 37 denotes a variable-length encoder, and 38 denotes a buffer memory. A format encoder 38 appends the address information and attribute data.

A chrominance information comparator 40 compares the chrominance information of a picture with chrominance information of preceding and/or succeeding picture, and in particular compares the chrominance components of each picture with chrominance components of preceding and/or succeeding picture, used as a reference picture, after motion compensation by motion vector detection. A luminance information comparator 41 compares luminance information of each picture with luminance information of the preceding and/or succeeding picture. A scene change judging circuit 42 judges whether or not a scene change is present on the basis of the outputs of the comparators 40 and 41. The members 40, 41 and 42 form a scene change detector 100.

A modulating circuit 43 serves to restrain the effect of the interference between codes, a laser modulating circuit 44 is for modulating the laser on the basis of the information from the modulating circuit 43. A servo circuit 45 performs focus tracking, feed control, and disk motor control. Reference numeral 46 denotes a system controller.

FIG. 2A and FIG. 2B show the recording format of digital motion picture image data in Embodiment 1. In FIG. 2A, reference numeral 47 denotes wobble pits in a sample servo format or a mirror surface part for track offset correction in a continuous groove system, and corresponds to the wobble pits preformatted in the optical disk shown in FIG. 11 or a mirror surface part provided in the continuous groove shown in FIG. 10, 48 denotes a zone address for indicating the address in the disk of a constant angular velocity (CAV) system, 49 denotes a header indicating the head of the video GOP and a video GOP address indicating the address of the GOP, 50 denotes a video attribute data for recording the attribute data of the video signal, 51 denotes an I-picture header indicating the head of an I-picture, and 52 denotes a video header formed of the areas 49 to 51. Reference numeral 53 denotes an I-picture, 54 denotes a second I-picture data separated by servo pits or a mirror surface 47, and 55 denotes a third I-picture data separated in the same manner as the second I-picture data 54. Reference numeral 56 denotes a P-picture header, and 57 and 58 denote P1-picture data separated in the same manner as the second I-picture data 54.

FIG. 2B shows the details of the format recorded in the video attribute data 50. Reference numeral 59 denotes a scalability mode (type of the hierarchy) of the digital image data arrangement, 60 denotes the number of frames in the GOP, 61 denotes the structure within the GOP defining the arrangement of I-, B- and P-pictures within the GOP, 62 denotes the structure of arrangement and position of the data within the I-picture, 63 denotes attribute data indicating whether the image within the GOP involves panning, zooming or scene change, 64 denotes a time code of a video area formed of a plurality of GOPs, 65 denotes an address of destination of jump during special playback, 66 denotes an audio mode, and 67 denotes a still-picture mode, 68 denotes a spare area.

FIG. 3A and FIG. 3B show how the disk rotation speed is varied for fast playback of the image data recorded in the format of FIG. 2A and FIG. 2B.

Figure 4:
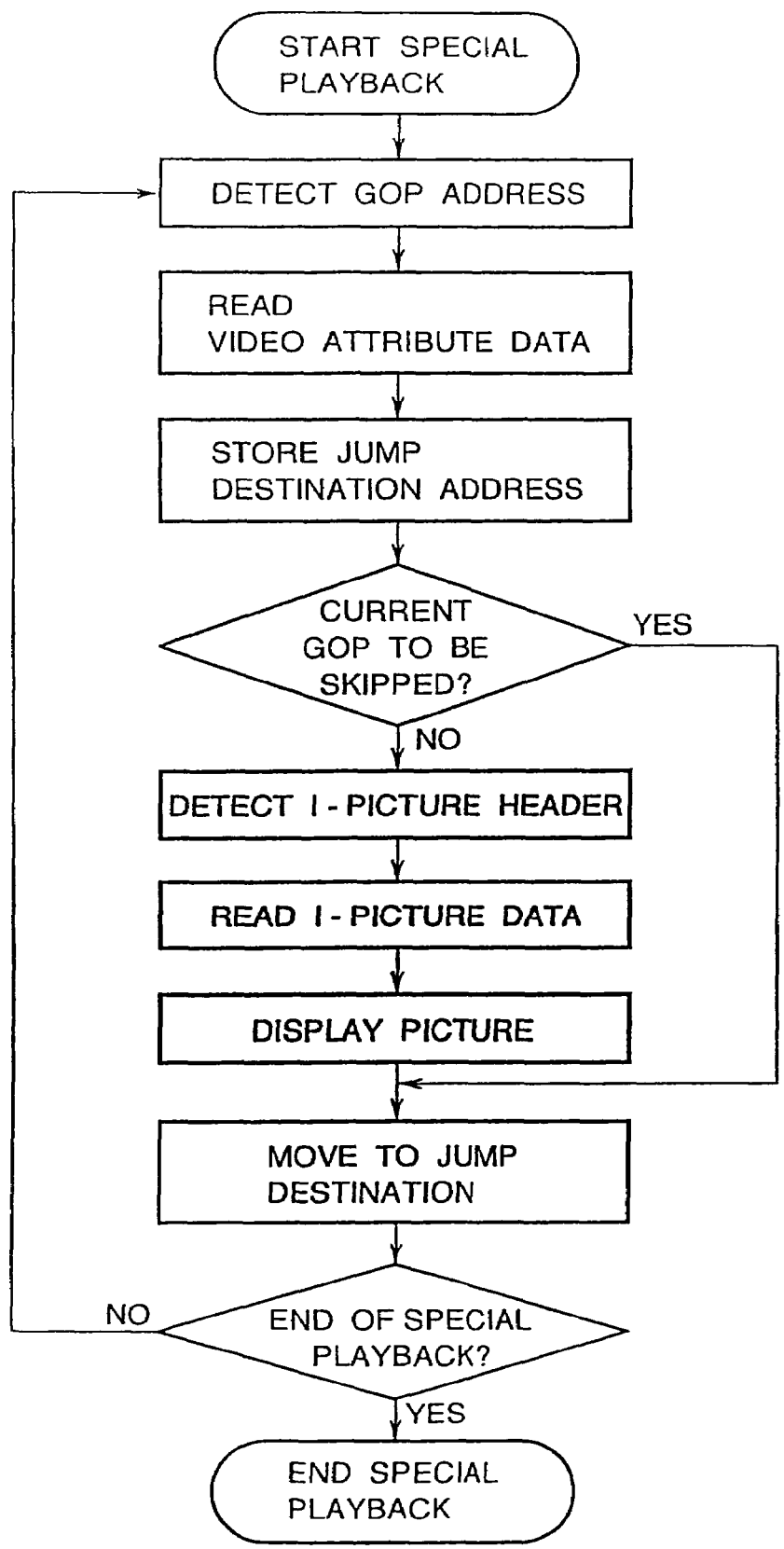
FIG. 4 is a flowchart showing the operation of the special playback on the basis of the jump destination address written in the video attribute data in Embodiment 1.
Figure 5:
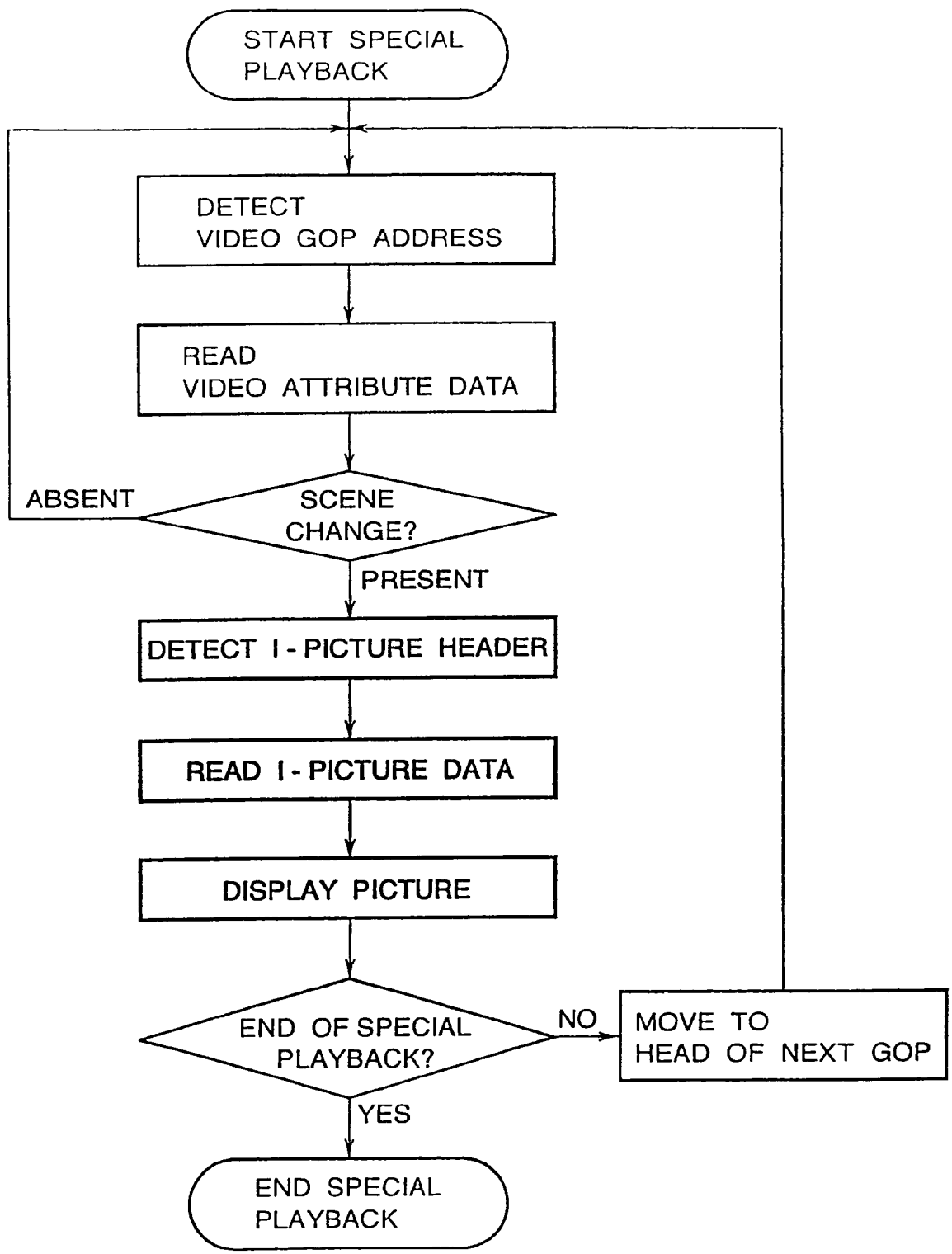
FIG. 5 is a flowchart showing the operation of data reading from the optical disk during special playback in Embodiment 1.
Figure 6:
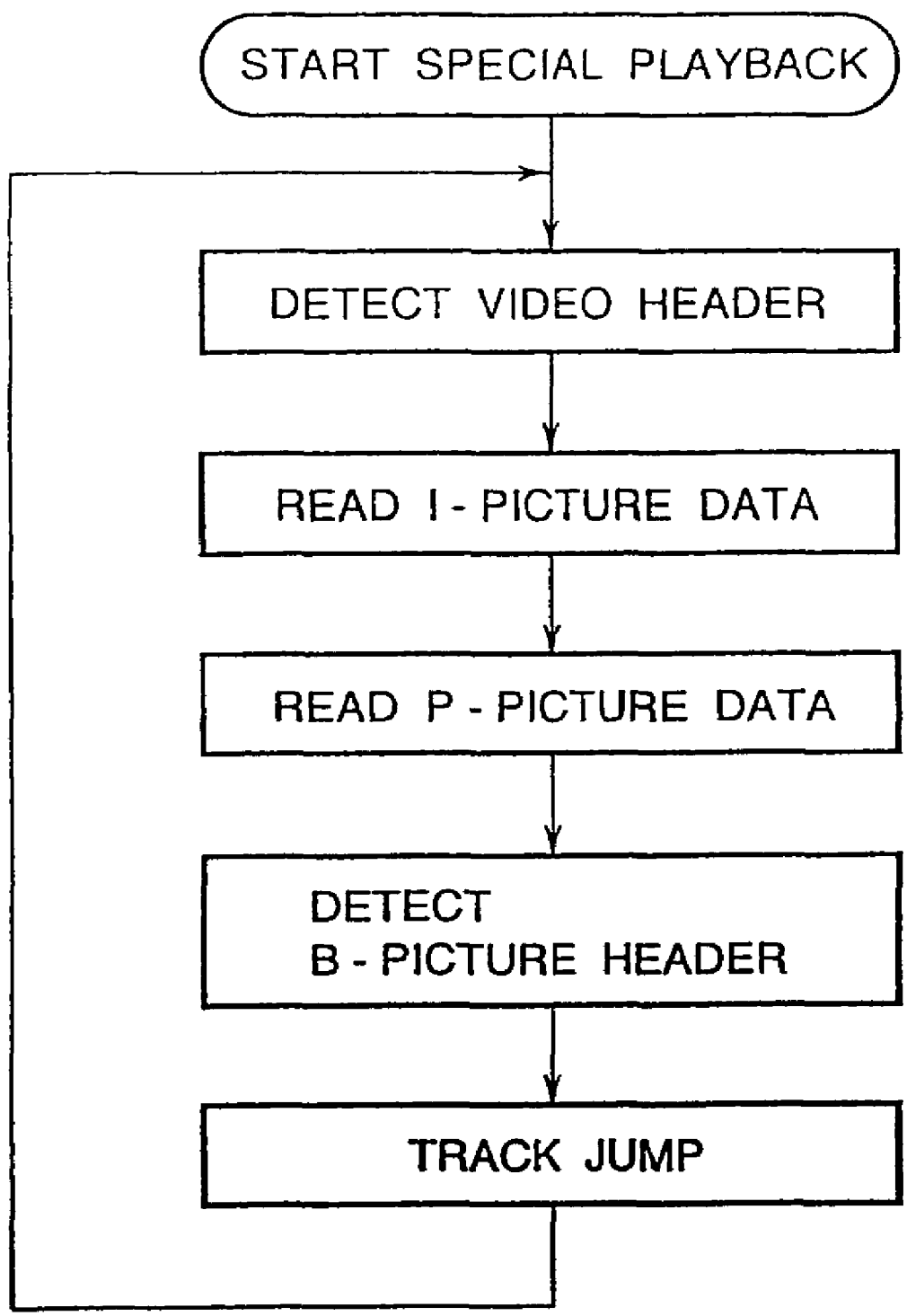
FIG. 6 is a flowchart showing the operation of reading data from the optical disk in special playback for continuously reproducing I- and P-pictures in Embodiment 1.

FIG. 4 is a flowchart showing the operation for the special playback using the jump destination address for the special playback written in the video attribute data area 50 at the head of the video GOP. FIG. 5 is a flowchart showing the operation for the special playback using the data indicating whether a scene change is present or not, written in the video attribute data area at the head of the video GOP. FIG. 6 is a flowchart showing the operation for the special playback using in which only the I- and P-pictures within the GOP are reproduced.

The operation of Embodiment 1 will next be described with reference to the drawings. The video signal represented by those of the MPEG system, is recorded on disk 12 after having been digital-video encoded. The analog video signal is first converted into digital data at the A/D converter 30, and a motion vector is then detected at the motion vector detector 31. Three-dimensional compression is effected by comparison with a reference image, discrete cosine transformation is effected in the frequency directions (two-dimensional directions) at the DCT circuit 32, quantization is effected at the adaptive quantizer 33, and variable-length encoding is effected by the variable length encoder 37.

The compressed digital motion picture information thus obtained is passed through the buffer memory 38 and the format encoder 39 where address, header, attribute data and the like are added, to be thereby give a format suitable for recording on the optical disk 12. Judgment on scene change is made by the use of the scene change detector 100 connected to the output of the DCT circuit 35 for comparing successive frames, or by the use of the motion vector detector 31 for detecting a rapid change in the image.

In particular, an accurate judgment on the scenes can be made at the scene change judging circuit 42 by comparing chrominance information and luminance information separately along the time axis, at the chrominance information comparator 40 and the luminance information comparator 41, and by comparing the amount of variation and variation speed for each picture.

The output of the scene change judging circuit 42 is stored as the presence or absence of a scene change in the video attribute data 50 in FIG. 2A and FIG. 2B. In the format of FIG. 2A, the video attribute data 50 can be used to record, in addition to the presence or absence of a scene change, the address of the jump destination at 65, the structure of the GOP at 61 and the number of pictures within the GOP at 60, the scalability mode at 59, the time code at 64 and the like, and special playback or the like can be effected using such attribute data.

FIG. 2A and FIG. 2B show the digital motion picture image data recording format, in which I- and P-pictures are adjacent to each other, and video attribute data 50 is disposed at the head of the GOP. At the time of recording, on the basis of the result of the judgment at the scene change judging circuit 42, the presence or absence of a scene change is stored in the video attribute data 50 in FIG. 2A, and the address of a jump destination during special playback is also stored in the video attribute data 50 at 65. Since the digital motion picture image recording circuit is provided with a buffer memory 38, the recording data is still held in the buffer memory 38 while the image is processed, so that the jump destination address can be stored.

For instance, when the GOP is of such an image which does not require jump playback (e.g., it consists of a succession of rapidly moving images, or still-picture-like image which is similar to the preceding GOP), information that the GOP need not be played back and should be skipped over is stored in the attribute data, and if the next GOP needs to be played back, a flag to that effect is set. The special playback is achieved by reproducing only the video attribute data 50 in sequence, and playing back the GOPs for which this flag at the head thereof is set.

Instead of the flag, designation of the jump destination address may be used in 65.

In the case of the reverse playback, the buffer memory 38 need not have a large capacity, and yet storage of the jump destination address and setting of the flag indicating whether the preceding GOP needs playback can be realized with ease.

The operation of reading from the optical disk is as shown in FIG. 5. First, the address of the head of the GOP is detected, and then the video attribute data 50 is read, an I-picture of the GOP is reproduced if a scene change is present, and jump is made to a next GOP if no scene change is present. In this way, the special playback is continued.

As shown in the flowchart of FIG. 4, special playback is also possible by reading the jump destination address stored in the video attribute data SO. In this case, by reading the video attribute data 50, the jump destination address is stored, and, on the basis thereof, an I-picture is reproduced, and a track jump is also conducted when the current GOP should be skipped over. In this way, the special playback is achieved.

By the use of the above methods, it is possible to achieve special playback in which only such GOPs of a plurality of GOPs formed on the disk that need to be reproduced are reproduced in turn. In these cases, still pictures are successively reproduced or still pictures at the heads of respective scenes are continuously reproduced.

In a special playback in which I- and P-pictures are continuously reproduced, the operation is as shown in FIG. 6. In this case, after the video header 52 is detected, I- and P-pictures are read, and when a B-picture header is detected, a track jump is conducted to the video head of the next GOP and similar operation is repeated in the successive GOPs. However, with this method, the special playback speed multiplier (the ratio of the time for normal replay to the time for fast replay) is limited because the amount of data for I- and P-pictures in each GOP is large.

Embodiment 2

Figure 7A:
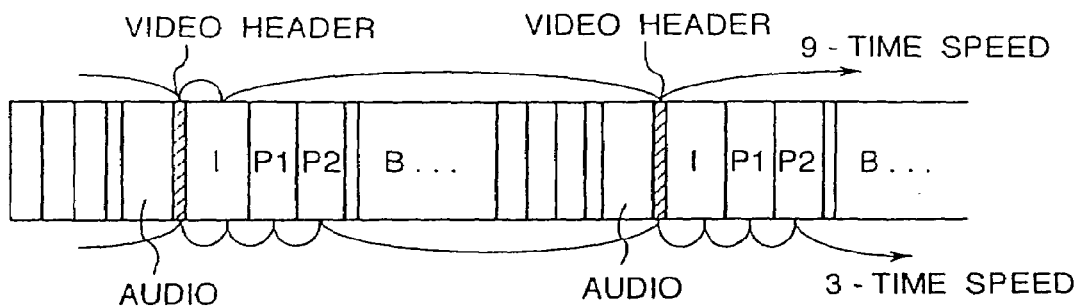
FIG. 7A to FIG. 7C are diagrams showing the digital image data recording format in Embodiment 2.
Figure 7B:
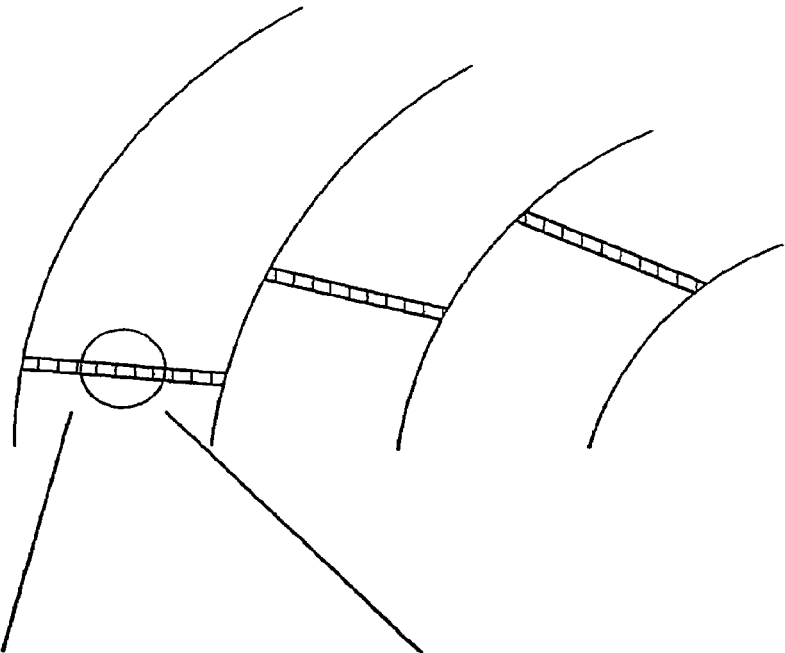
Figure 7C:
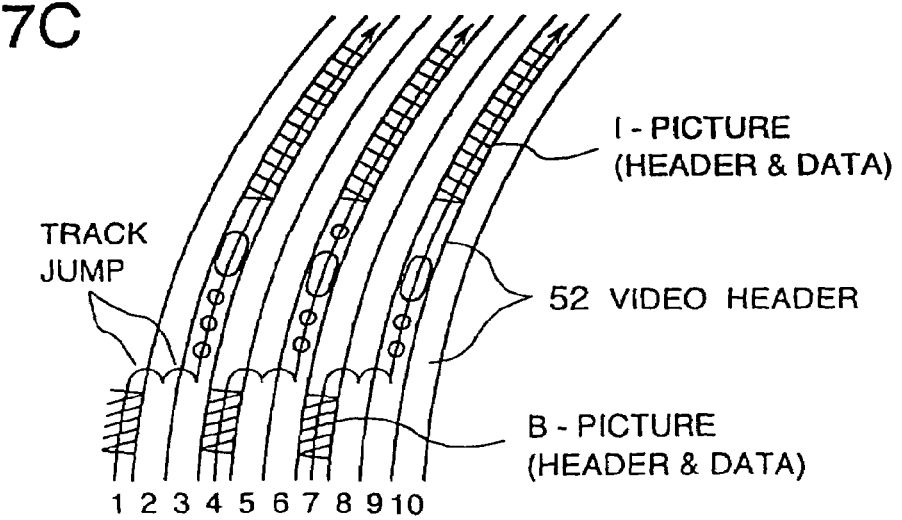

Embodiment 2 is next described with reference to the drawings. FIG. 7A shows the method of reading data in which the image data recorded in the format of FIG. 2A is fast-played back by track jump, and FIG. 7B shows the disposition of the video headers 52 on the disk, and FIG. 7C shows the track jump at the video header 52.

Figure 8:
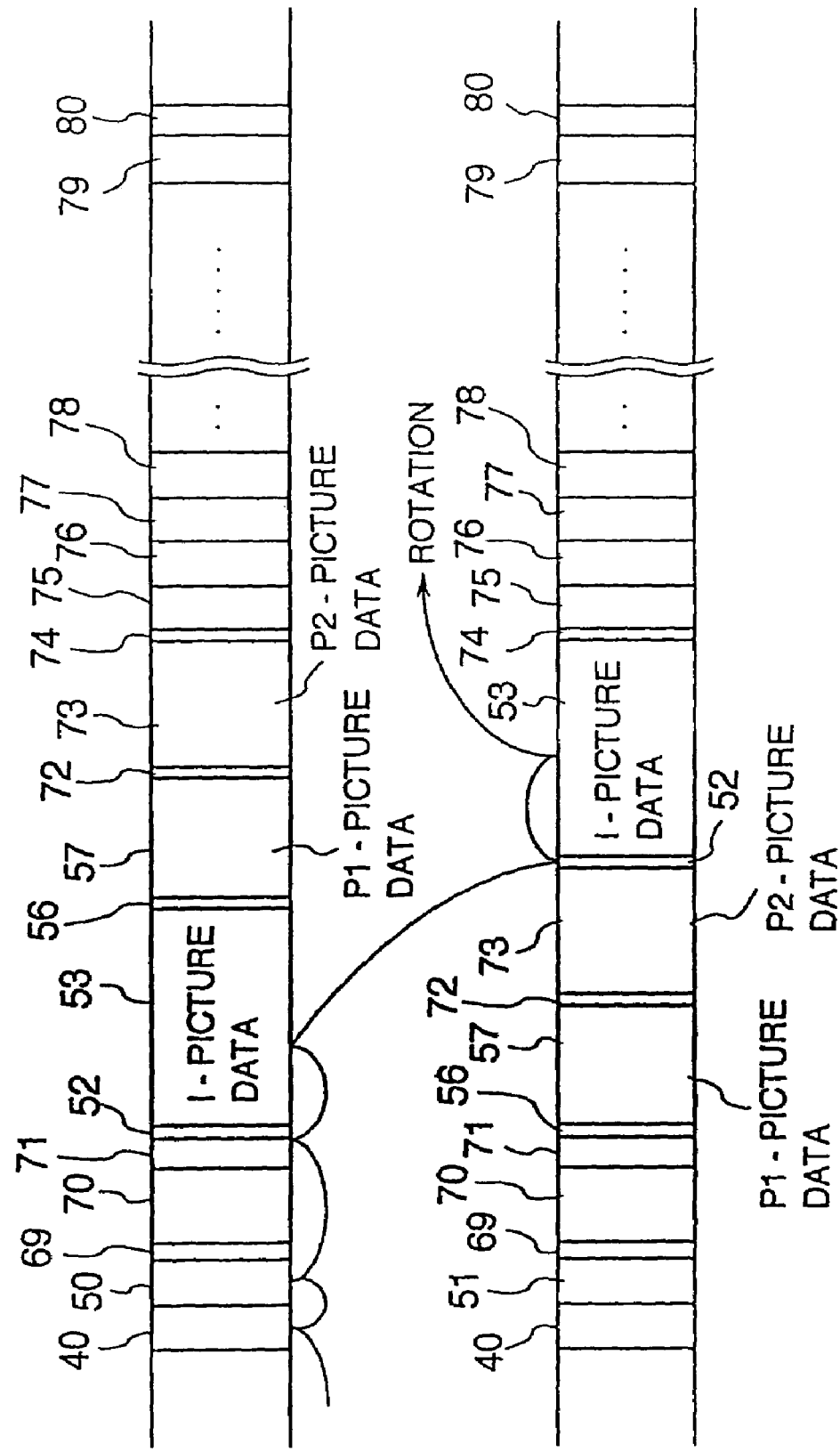
FIG. 8 is a diagram showing the digital image data recording format in Embodiment 2.

In FIG. 8, the order of I- and P-pictures is reversed at every track-adjacent GOP, so that I-picture reproduction at the time of track jump is achieved with a shorter rotation waiting time. A rotation waiting time occurs when, for example, a track jump occurs but the next picture to be reproduced is not located under the optical head 8. Thus, one must wait for the disc 12 to rotate such that the next picture to be reproduced is properly located under the optical head 8. In the drawing, reference numeral 69 denotes an audio header indicating the head of the audio signal, 70 denotes audio data, 71 denotes a video data recognition parity for recognition of the head of the video data, 72 denotes P2-picture header indicating the head of the second P-picture, 73 denotes P2-picture data, 74 denotes a B-picture header indicating the head of B-pictures, 75 to 79 denote B1- to Bn-picture data, and 80 denotes an end mark indicating the end of the GOP.

Figure 9:
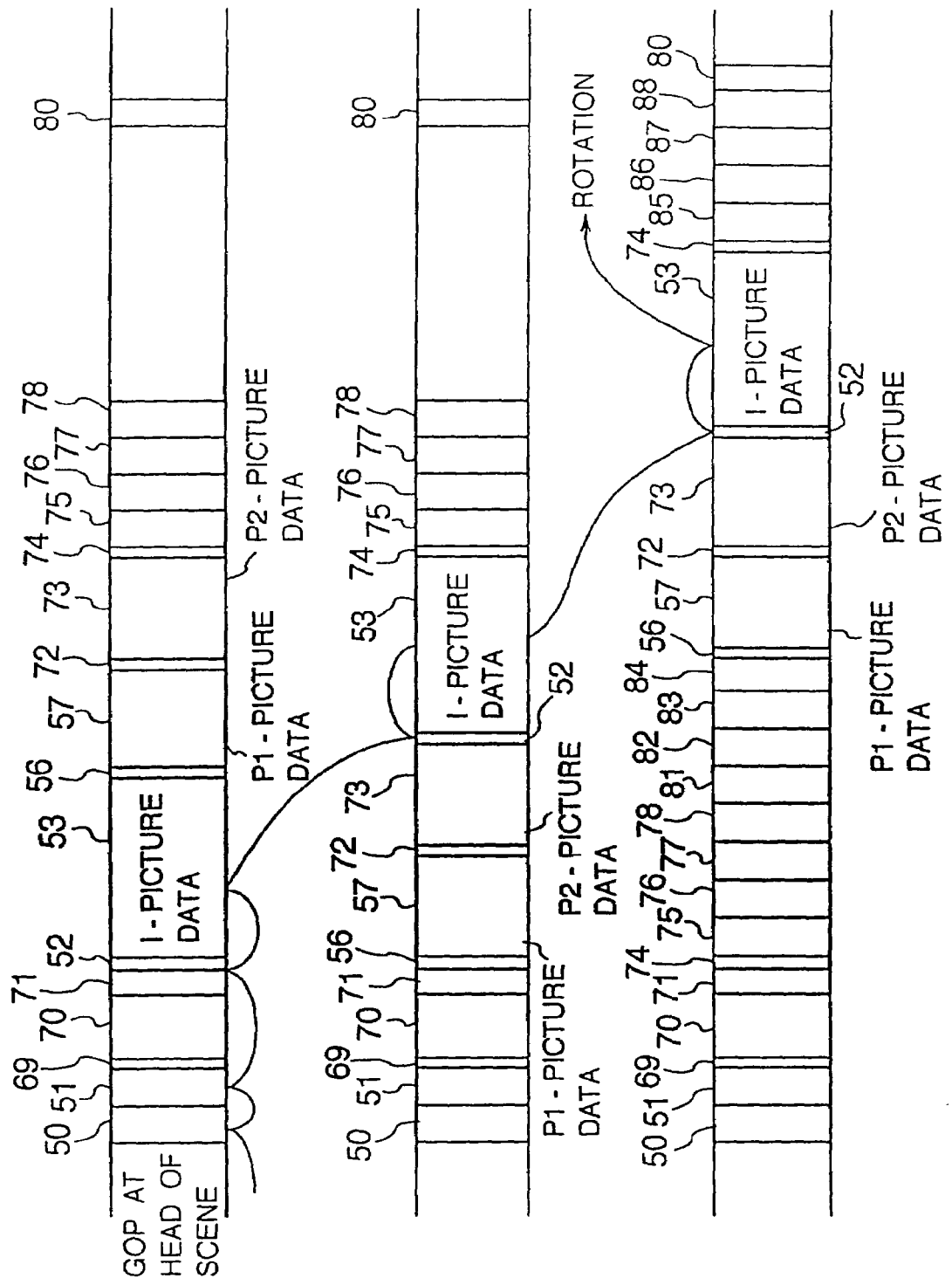
FIG. 9 is a diagram showing the digital image data recording format in Embodiment 3.

In FIG. 9, the positions at which I- and P-picture image information is disposed are shifted from one GOP to another track-adjacent GOP, so that I-picture reproduction at the time of track jump is achieved with an even shorter rotation waiting time. In the drawing, reference numerals 81 to 88 denote B-picture (B5- to B12-picture) data.

The operation of Embodiment 2 will next be described with reference to the drawings. In FIG. 7A, the data in the GOP is arranged in the order of I-, P- and B-pictures. In this case, special playback is achieved by repeating the steps of reading the video header 52 including the video GOP address 49 and the video attribute data 50 shown in FIG. 2A, then reproducing an I-picture, and skipping P- and B-pictures, and then reproducing an I-picture in the next GOP, and so on.

Figure 15:
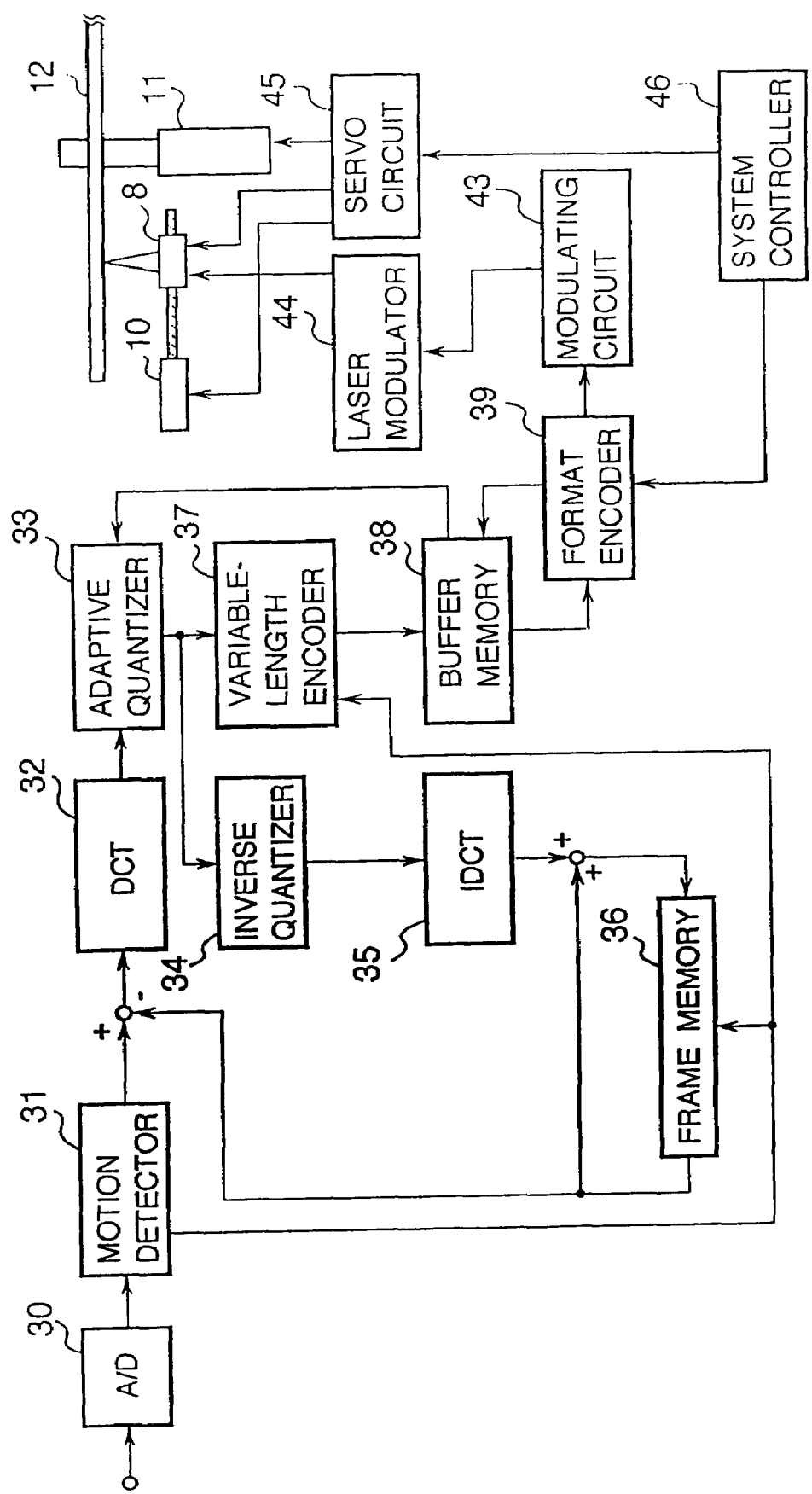
FIG. 15 is a block diagram showing a digital motion picture image information recording device using an optical disk of Embodiment 4.
Figure 32:
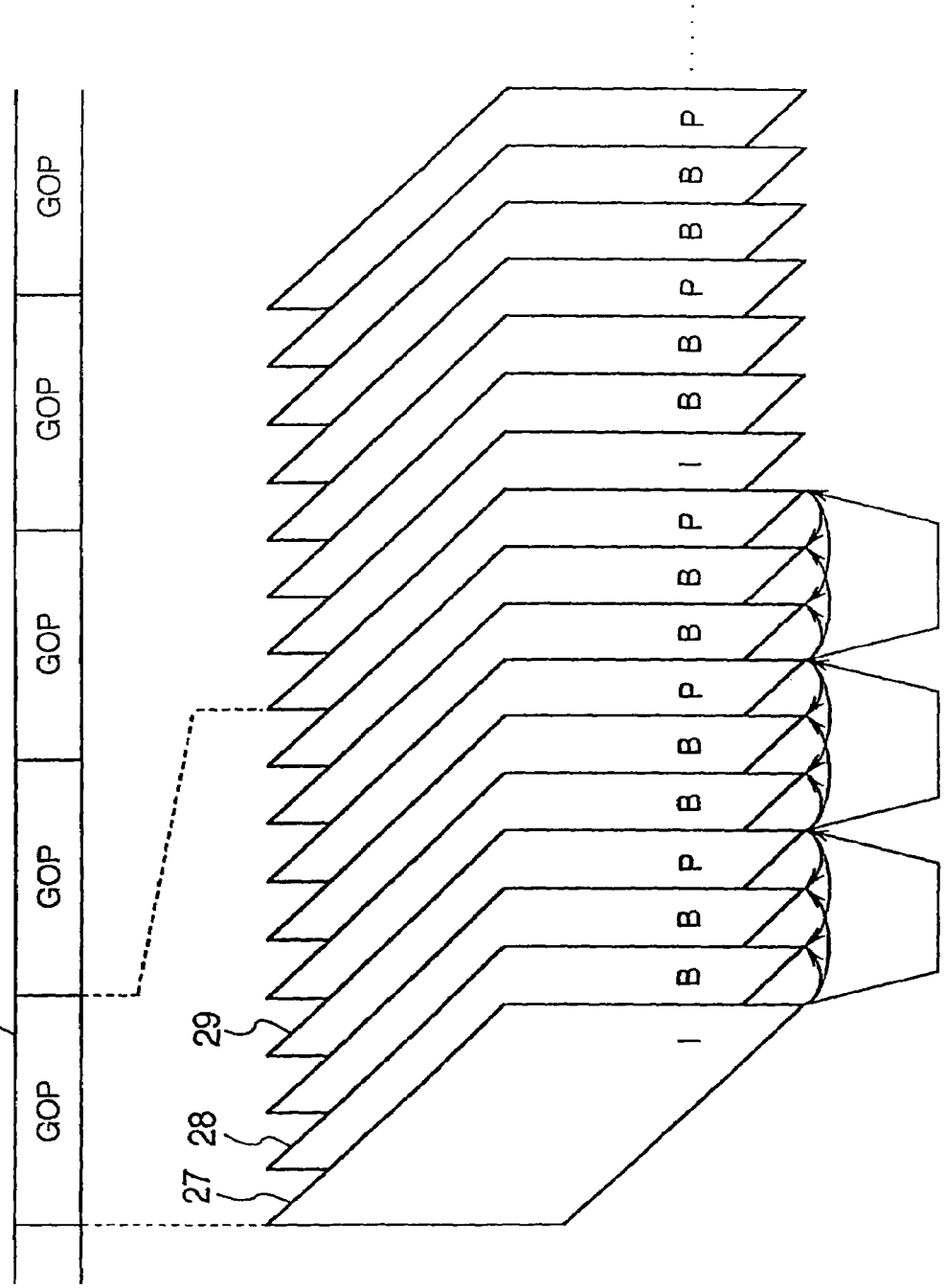
FIG. 32 is a diagram showing the code structure in which one GOP is formed of 10 pictures.
Figure 33:
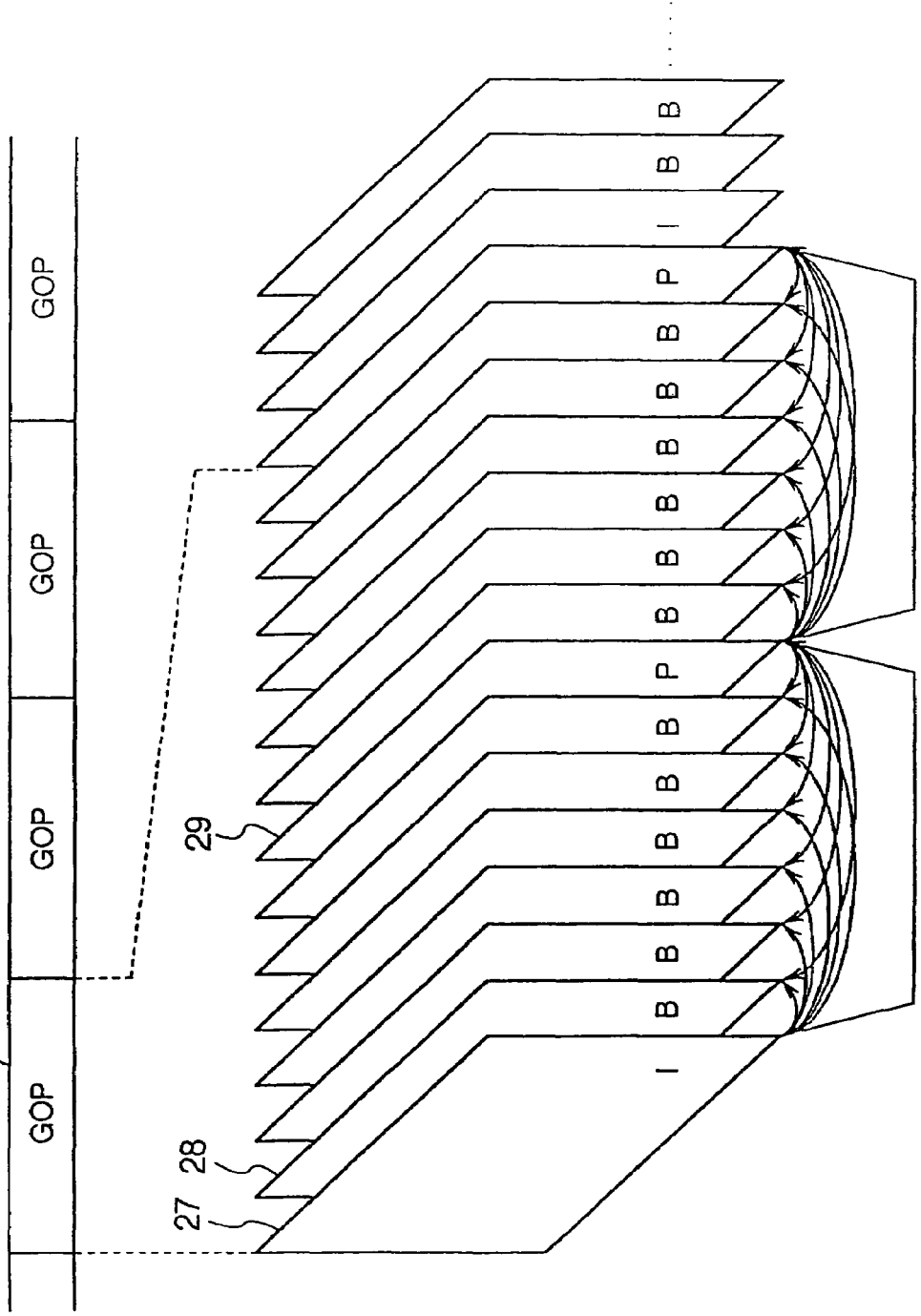
FIG. 33 is a diagram showing the code structure in which one GOP is formed of 15 pictures.
Figure 34:
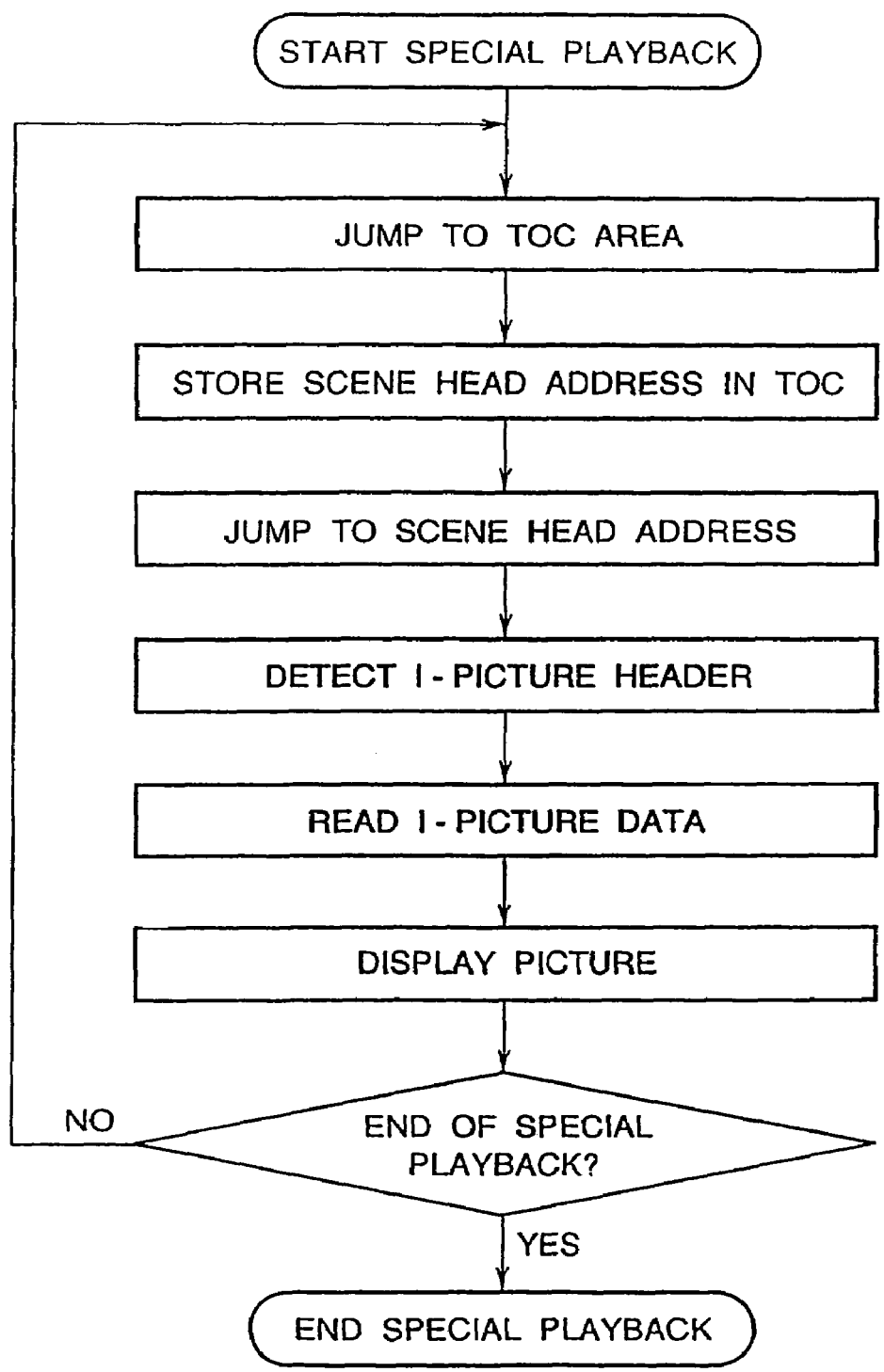
FIG. 34 is a flowchart showing the operation during special playback conducted on the basis of the address stored at the head of scene in digital motion picture image information stored in the conventional recording format, in the TOC area at the inner periphery of the disk

In such a case, because the data occupation proportion of an I-picture in each GOP is fairly large, and the amount of data of an I-picture is three to five times the amount of data of a B-picture. Therefore, even if reproduction of P- and B-pictures is omitted, the special playback efficiency (as a ratio of the amount of data which is not read to the amount of data that is read during special playback) is not so high, and in addition the rotation waiting time is present. As a result, the special playback speed multiplier is not high. If, however, one GOP consists of 10 pictures as shown in FIG. 32 or 15 pictures as shown in FIG. 33, special playback at about double or triple speed is possible.

In order to reduce the rotation waiting time, the data arrangement shown in FIG. 8 is conceived. In the illustrated data arrangement, the order of I- and P-pictures is opposite between track-adjacent GOPs. In the case of FIG. 8, when reproduction of an I-picture 53 in a first GOP is completed, and track jump is effected, then reproduction of an I-picture 53 in the next track-adjacent GOP is commenced immediately or after only a certain servo stabilizing period.

Furthermore, by changing the order of the I-, P- and B-pictures every track-adjacent GOP as shown in FIG. 9, it is possible to achieve an arrangement in which I-pictures can be read continuously for more GOPs. In the illustrated example, I-pictures can be read continuously for three GOPs, so that substantially smooth special playback by the continuous reproduction of I-pictures for the three GOPs is possible.

By reproducing I-picture data, playback can be achieved without rotation waiting between GOPs. Accordingly, unlike Embodiment 1, smooth continuous motion picture special playback is possible.

Embodiment 3

Figure 10:
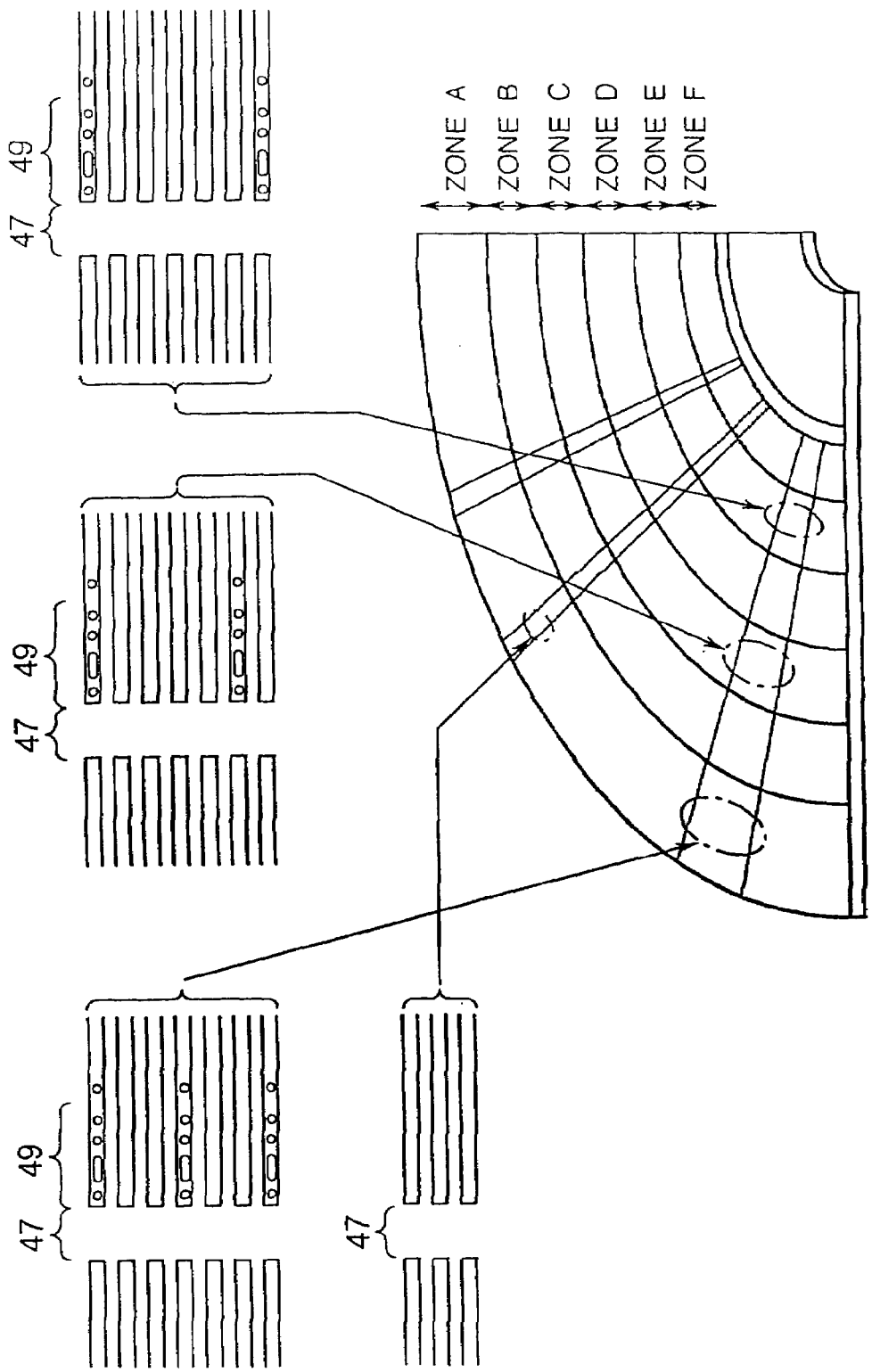
FIG. 10 is a diagram showing the digital image data recording format on the disk in the continuous guide groove system in Embodiment 3.
Figure 11:
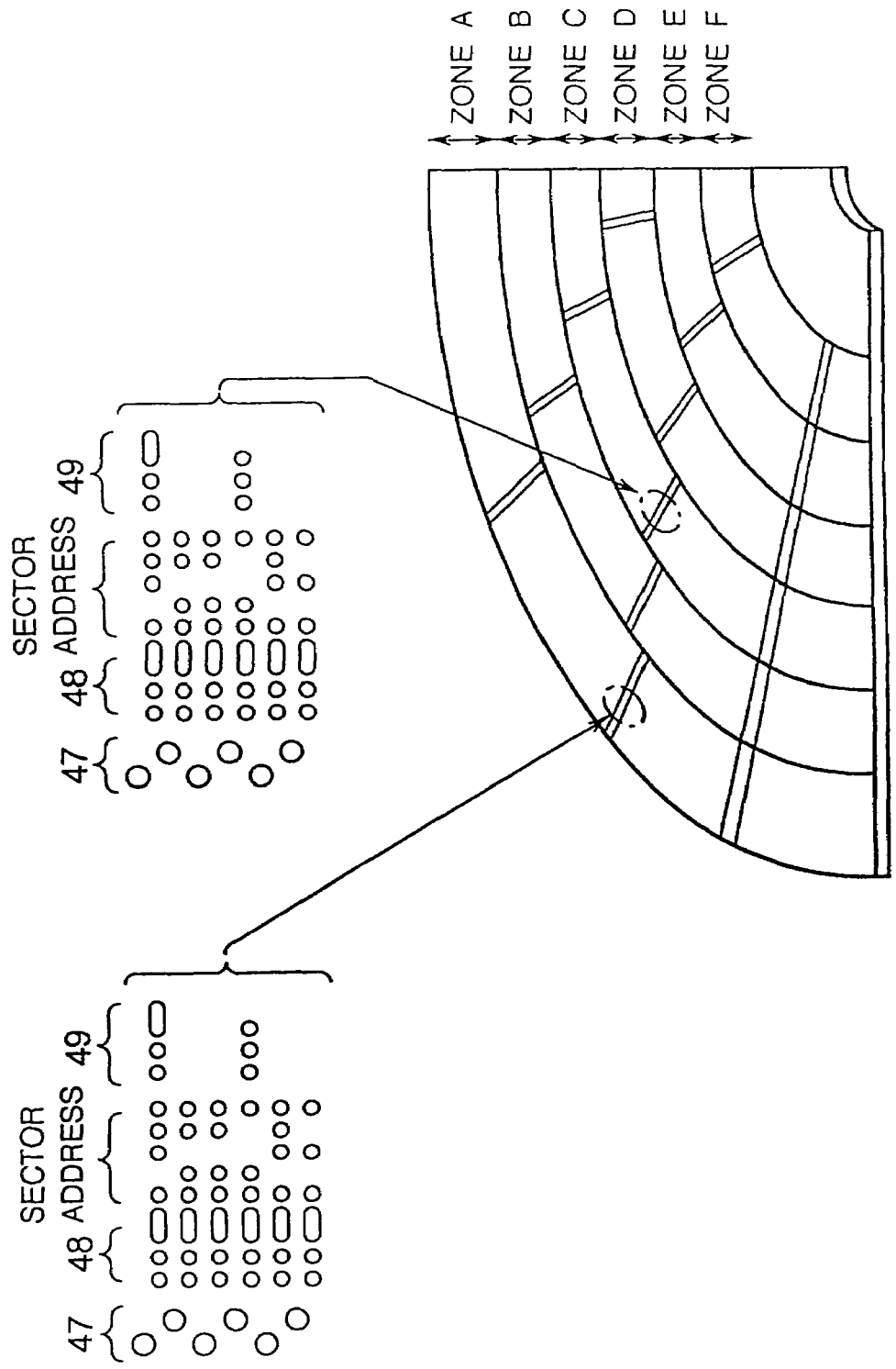
FIG. 11 is a diagram showing the digital image data recording format on the disk in the sample-servo system in Embodiment 3.
Figure 12:
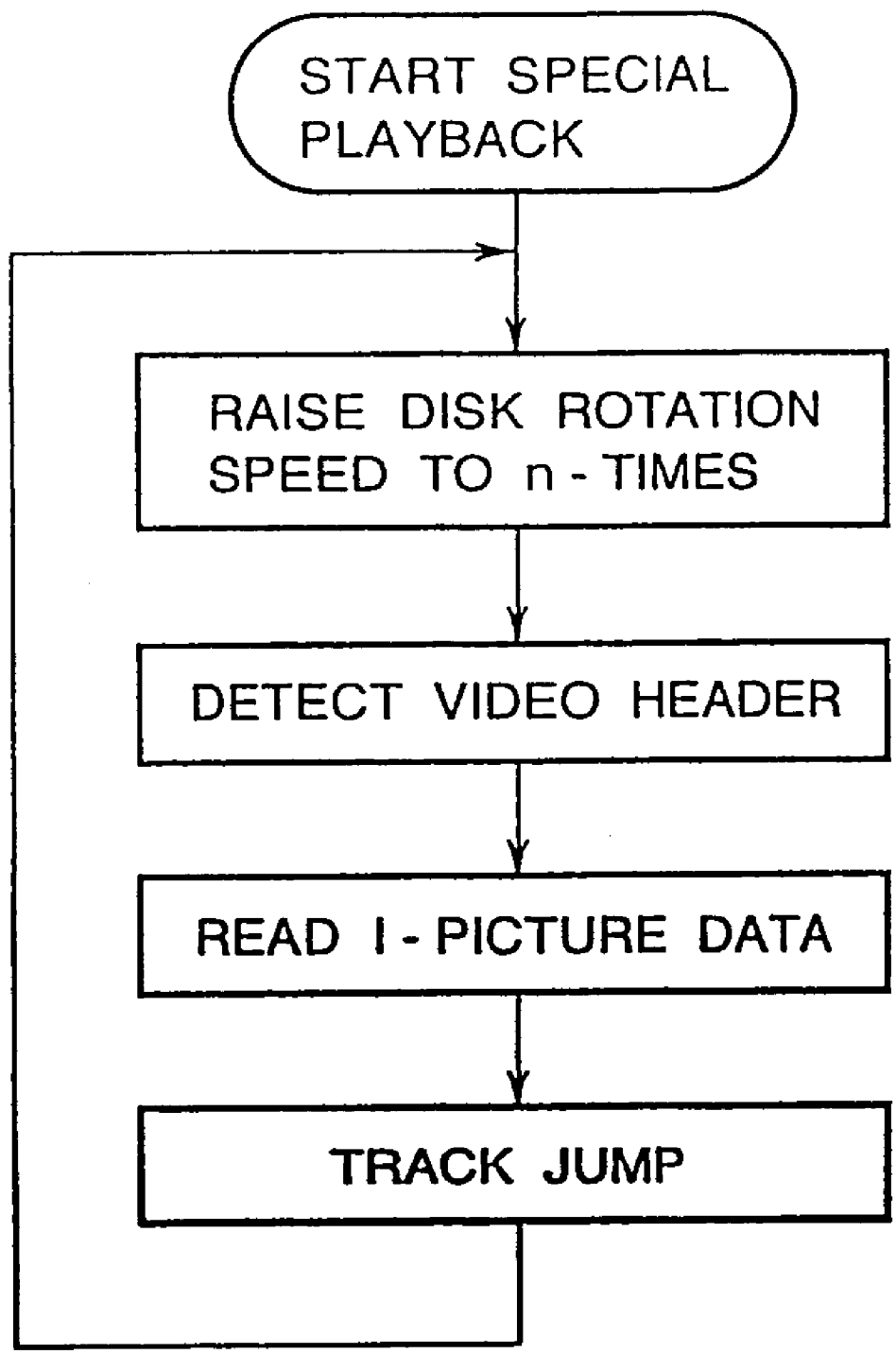
FIG. 12 is a flowchart showing the reading operation of Embodiment 3, in which the disk rotation speed is raised during special fast playback.

FIG. 10 shows a format arrangement on a disk of a continuous groove type in Embodiment 3. FIG. 11 shows a format arrangement on a disk of a sample servo type in Embodiment 3. FIG. 12 is a flowchart showing the operation of reading data in which the disk rotation speed is increased during special playback.

The operation of Embodiment 3 will next be described. Generally, for the purpose of increasing the recording density of an optical disk, constant linear velocity (CLV) recording is advantageous over constant angular velocity (CAV) recording. However, in CLV recording, the head of image data and the disposition on the I-picture on the disk is not fixed, and because in particular the angular position of the I-pictures is at random, the operation of Embodiment 1 or Embodiment 2 is difficult. The disk is therefore divided into zones, e.g., zones A to F as illustrated in FIG. 10 or FIG. 11, and the head regions of the GOPs within each zone are made to be aligned in the radial direction of the disk.

The linear recording density can be made substantially equal between different zones, by varying the disk motor rotational speed between different zones, or by varying the frequency of the data clock during recording and playback.

But in such a case, the recording capacity per one revolution of the disk is different between different zones. It is possible to realize the zone division by which the recording capacity per GOP is a multiple of the recording capacity per revolution. For instance, it may be so set that one GOP is formed of five tracks in the innermost zone, while one GOP is formed of two tracks in the outermost zone.

Instead of setting the recording capacity per GOP to be a multiple of the recording capacity per revolution, it may alternatively be so set that the recording capacity per GOP is a multiple of the recording capacity per half a revolution. Then, finer zone division is possible. If it is so set that the recording capacity per GOP is a multiple of the recording capacity per a quarter of one revolution, even finer zone division is possible.

In this case, the GOP address in the video information is written immediately after the servo pits (wobble pits) in the sample servo type or the mirror surface part in the continuous guide groove type, and by setting the length of the mirror surface part or the wobble pits in which the GOP address is recorded to be of a different length from other parts, the sum signal (reflection signal) from the optical head can be used as an index during search.

In the system for recording and playing back digital motion picture image using an optical disk, such as those described above, the special playback can be achieved by using track jump as described in connection with Embodiment 1 and Embodiment 2. It is also possible to increase the disk rotation speed during continuous playback in order to further increase the overall playback speed. For instance, the disk rotation speed is doubled, and the data transfer rate is doubled, and yet the data reproduction is possible. By reproducing I- and P-pictures only, double speed playback can be achieved.

If the disk rotational speed is increased to four or eight times, the data rate is too high, and the data detection may be impossible. In such a case, while I- and P-pictures are reproduced the disk rotational speed may be lowered to such a value at which playback is possible, and while B-pictures are reproduced the disk rotation speed may be increased, as shown in FIG. 3B.

The operation of the optical disk drive for such a playback is as shown in FIG. 12. The operation including the following steps is repeated. First, the rotational speed is increased to n-times, and then the video header is detected to read an I-picture, and jump is made to the next GOP. By disposing an I-picture in the video attribute data 50, the disk motor acceleration region and the deceleration region can be set.

Embodiment 4

Figure 13A:
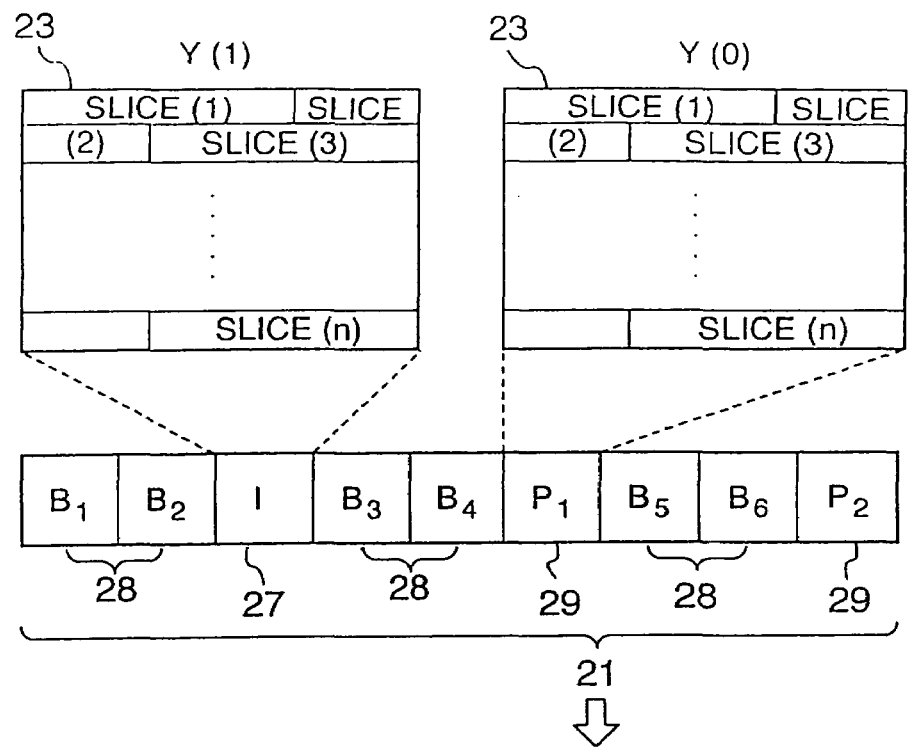
FIG. 13A and FIG. 13B show the arrangement of data in a GOP of digital motion picture image data, and the overall data arrangement including audio data.
Figure 13B:
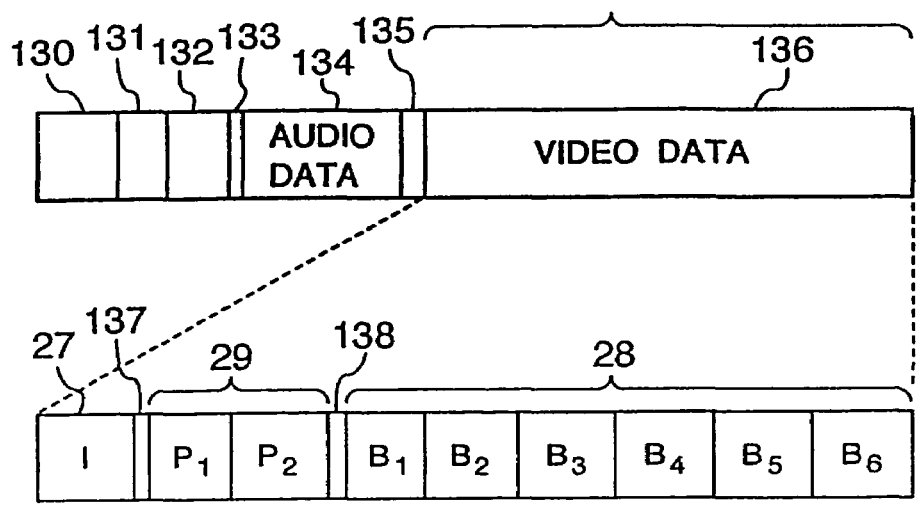

Embodiment 4 of the invention will next be described. FIG. 13A and FIG. 13B show the data structure of the digital motion picture image according to Embodiment 4. FIG. 13A shows the structure of a GOP, FIG. 13B shows the data arrangement of the entire GOP including audio data. In the drawings, reference numerals 21 to 29 denote data identical to those described in connection with the prior art example with reference to FIG. 30 to FIG. 33. Reference numeral 130 denotes a header indicating the head of the data, 131 denotes an address of each GOP forming a unit of editing, 132 denotes attribute data attendant to the digital motion picture image data, 133 denotes an audio header indicating the head of audio data 134. Reference numeral 135 denotes a video header indicating the head of video data 136. Reference numeral 137 denotes a P-picture header indicating the head of a P-picture 29. Reference numeral 138 denotes a B-picture header indicating the head of a B-picture 28. In the drawings, P-, B- and I-pictures are respectively represented as "P-picture," "B-picture," and "I-picture."

Figure 14:
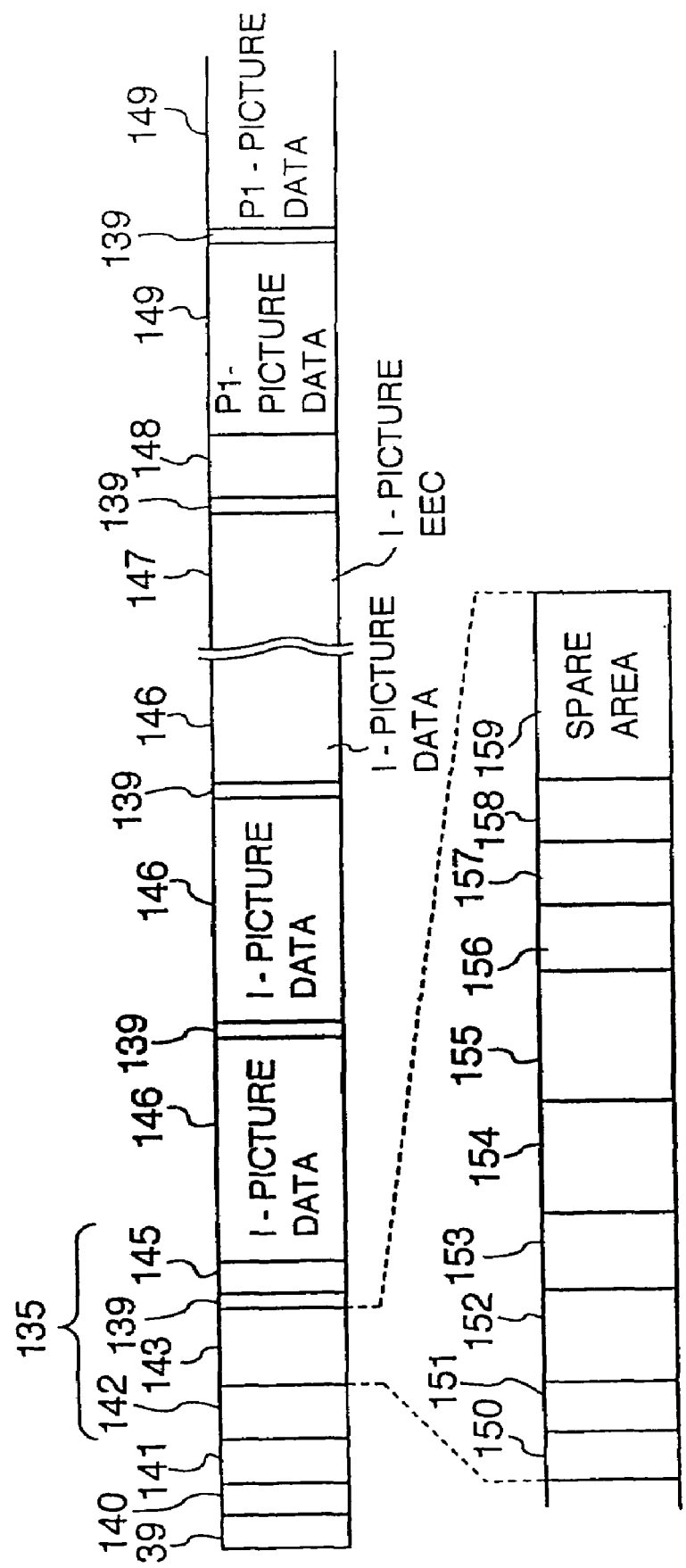
FIG. 14 shows data arrangement of digital motion picture image data recorded on an optical disk in Embodiment 4.

FIG. 14 shows the details of configuration of the digital motion picture image data arrangement in Embodiment 4. Reference numeral 139 denotes wobble pits in the sample format or a mirror surface part for offset correction in the continuous guide groove type, 140 denotes a zone address in the optical disk of a zone constant angular velocity (CAV) rotation system, 141 denotes a sector address for each sector which is a fraction of a GOP, 142 denotes a video GOP address for each video GOP, 143 denotes a video attribute data attendant to a digital motion picture image, and 145 denotes an I-picture header indicating the head of I-picture data 146. Reference numeral 147 denotes I-picture ECC (error correction code) recording the I-picture data error correction code, and 148 denotes a P-picture header indicating the head of P-picture data 149. Reference numeral 150 denotes a scalability mode, 151 denotes the number of frames within the GOP, 152 denotes the GOP structure showing the arrangement of I-, B- and P-pictures, and the like within the GOP, 153 denotes the arrangement and position of data within an I-picture, 154 denotes detailed attribute data such as presence or absence of panning, zooming and scene change, 155 denotes a time code, 156 denotes an address of destination of jump during special playback, 157 denotes an audio mode, 158 denotes a still picture mode, and 159 denotes a spare area.

FIG. 15 is a block diagram showing an optical disk recording device for use with an optical disk according to Embodiment 4. The illustrated recording and playback device is identical to that shown in FIG. 1, except that the scene change detector 100 in FIG. 1 is not provided. The reference numerals 8, 10-12, 30-39, and 43 to 46 denote members or components identical to those in FIG. 1.

Figure 16:
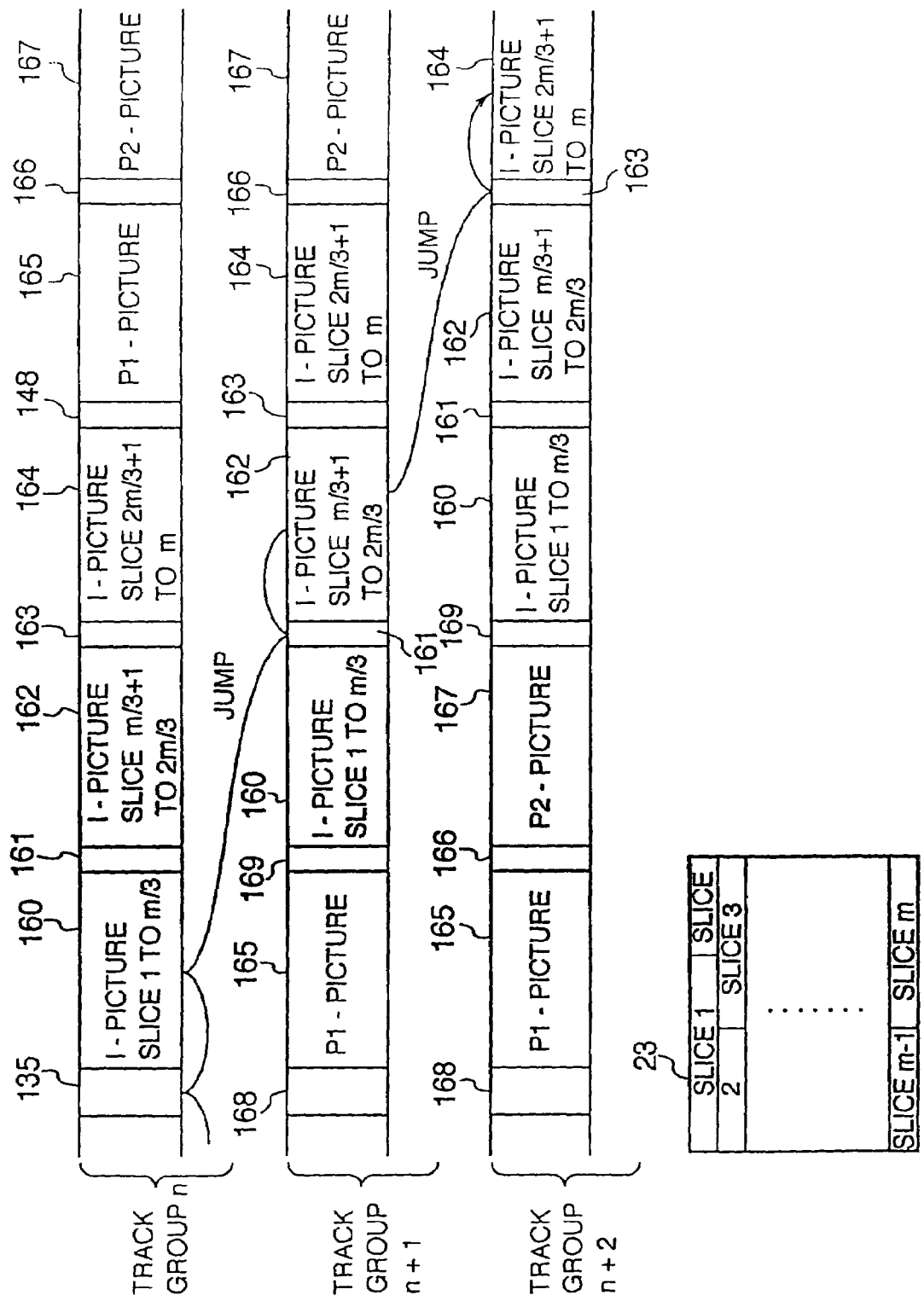
FIG. 16 shows data arrangement of screen-divided I-picture data in a GOP in Embodiment 4.

FIG. 16 shows the structure of details of the part where I-picture data is recorded on the optical disk. The video header 135 indicates the head of the video data in nth track group, 160 denotes fraction data formed of a plurality of slices for the top ⅓ part (from the top edge to a first horizontal dividing line ⅓ as measured from the top edge of the screen) of the screen of the I-picture 27. Reference numeral 162 denotes a fraction data formed of a plurality of slices for the middle ⅓ part (from the first horizontal division line to a second horizontal dividing line at ⅔ as measured from the top edge of the screen) of the I-picture 27. Reference numeral 164 denotes a fraction data formed of a plurality of slices for the bottom ⅓ part (from the second horizontal dividing line to the bottom edge of the screen) of the I-picture 27. Reference numeral 161 denotes a sub-header indicating the head of fraction data 162. Reference numeral 163 denotes a sub-header indicating the head of fraction data 164. Reference numeral 148 denotes a P-picture header, 165 denotes a first P-picture data within the GOP, and 166 denotes a header indicating the head of a second P-picture data 167. Reference numeral 168 denotes a header indicating the entirety of each of the digital motion picture image of (n+1)-th and (n+2)-th track groups, and also indicating the head of P-picture data, 169 denotes a header indicating the part 160 where the data for the slices 23 in the upper ⅓ part of the screen of the I-picture 27 is recorded.

Figure 17:
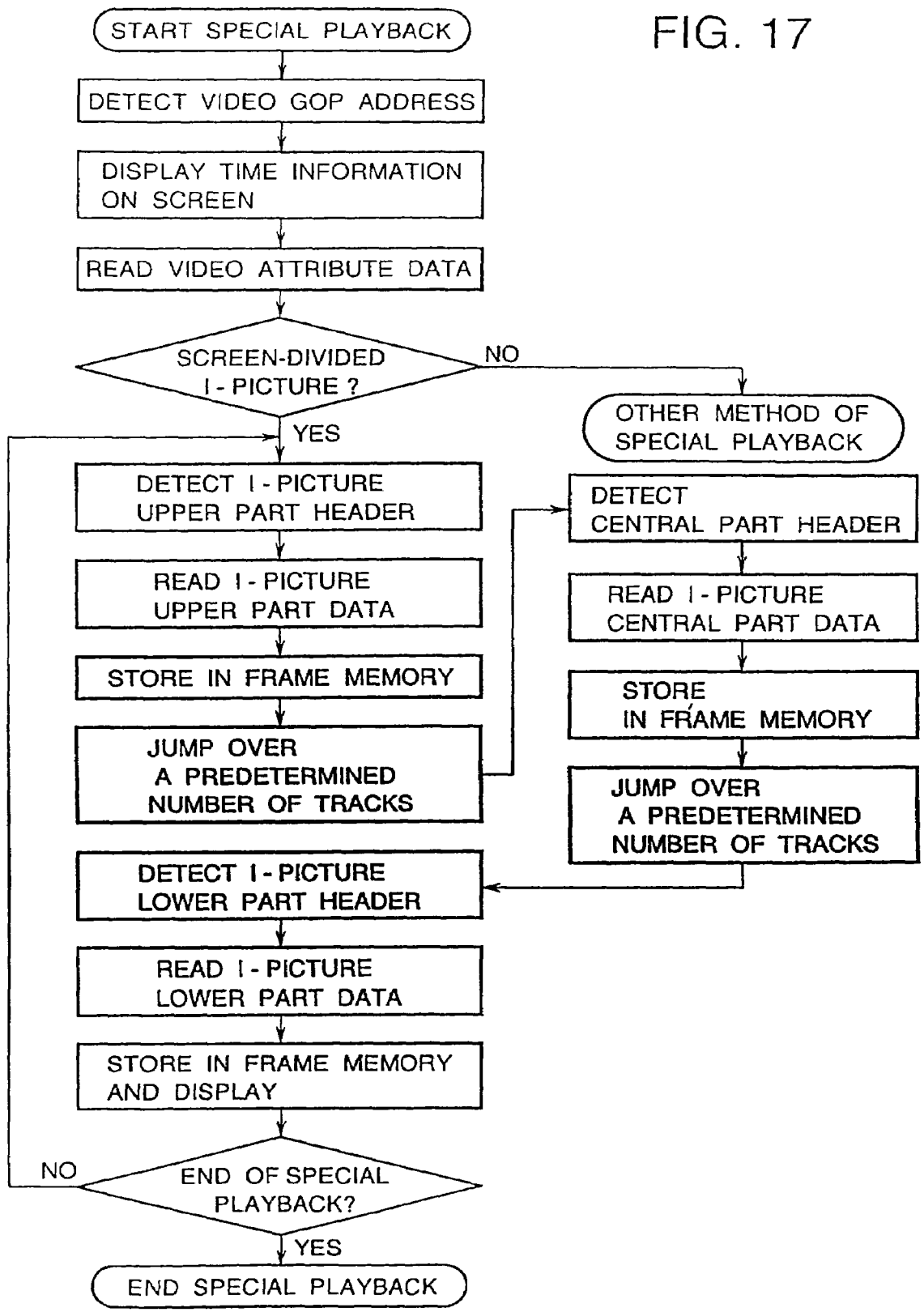
FIG. 17 is a flowchart showing the operation of Embodiment 4.

FIG. 17 is a flowchart showing the operation of special playback of a motion picture in an optical disk device, with a system having a digital motion picture image data file structure in which the screen is divided in the vertical direction of the screen into fractions, each comprising a multiple of slices.

Figure 31:
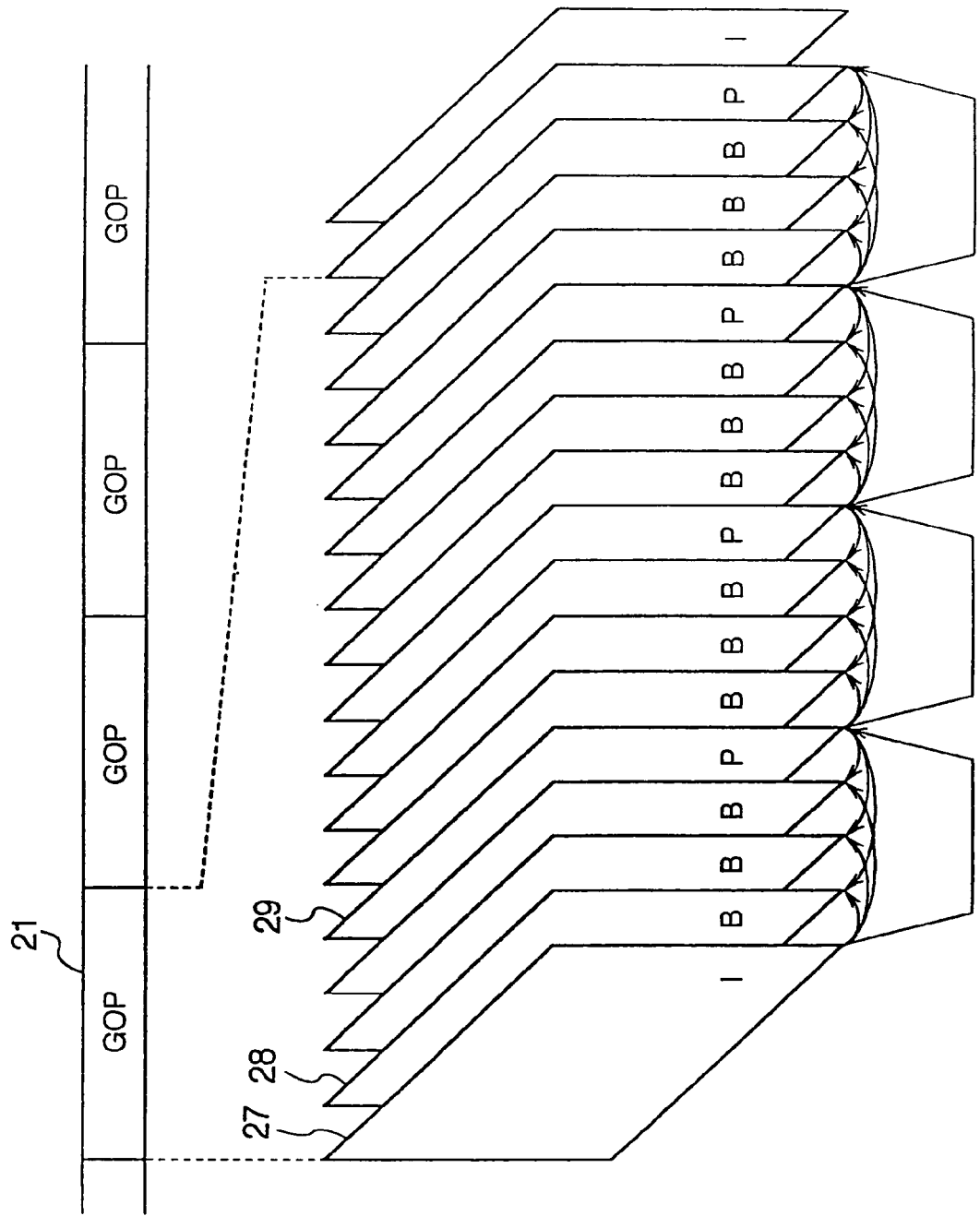
FIG. 31 is a diagram showing the code structure in which one GOP is formed of 17 pictures.

The operation will next be described. A digital motion picture image data usually is formed of a mixture of data of I-, B- and P-pictures 27, 28 and 29, as shown in FIG. 31 to FIG. 33 in connection with the prior art example. An I-picture 27 can be reproduced independently because two-dimensional compression is used. However, P-pictures cannot be reproduced until the I-picture is reproduced, and B-pictures cannot be reproduced until the I- and P-pictures have been reproduced. A data arrangement on the disk that is advantageous from the view point of the signal processing is therefore, that I and P-pictures are successively disposed first in the GOP as shown in FIG. 13B, and B-pictures are thereafter disposed.

In this case, it is also desirable that the audio data is also arranged for each GOP. This enables after-recording (recording audio signal after video signal) and editing. Moreover, with the data structure shown in FIG. 13A and FIG. 13B by providing video GOP address 142, headers 145 and 148 indicating the heads of I- and P-pictures as shown in FIG. 14, to enable editing for each GOP it is possible to extract a I-picture data of a single picture alone, or P-picture data of a single picture alone.

By providing a region 143 in which attribute data of the digital motion picture image data is written, and by providing scalability mode 150 indicating whether the hierarchial structure is suitable for use with the particular numbers of pixels and lines on the screen, the number of frames, 151, within the GOP, the GOP structure 152 indicating the arrangement and the like of I-, B- and P-picture data within the GOP, the disk can be used in conjunction with a variety of signal processing systems. By describing the I-picture data structure within the GOP structure 152, the arrangement suitable for the special playback which will be described below can also be adopted.

As has been described, with the format in which I- and P-pictures are successively disposed in the GOP, it is possible to implement special playback by modifying the I-picture data structure. In this case, by dividing the I-picture data into one-third fractions, each comprising an integer number of slices, as shown in FIG. 16, and the positions of the file blocks corresponding to the respective positions on the screen are exchanged between GOPs. Such a data arrangement is possible by controlling the buffer memory 38 by means of the format encoder 39 in the optical disk recording and playback device shown in FIG. 15.

With the file structure shown in FIG. 16, if the heads of the GOPs are aligned in the disk radial direction, it is possible to reproduce image of one picture from 3 GOPS, by performing track jumps, as illustrated, and adjoining the data for the fractions of I-picture. Partial continuous reproduction of I-pictures can be achieved with short rotation waiting times, so that the speed of the fast playback using I-picture data can be made high even though the amount of I-picture data is larger than P- and B-pictures.

Moreover, with the disk format of the zone CAV system, GOP head data can be aligned in the disk radial direction, if the zone allocation is such that the amount of data per GOP is a multiple of one revolution or a multiple of half a revolution.

The operation of the optical disk device during the special playback described above is shown in the flow chart of FIG. 17. First, when the special playback is started, the video GOP address is detected, and the time code and the like are displayed on the screen by means of a character generator or the like. Next, the video attribute data in the GOP is read, and judgment as to whether the I-picture is of the divided type. If it is of the divided type, the header at the top part of the screen of an I-picture is detected, and the data is read, and track jump is then performed, and the header for the central part of the screen is detected and the data is read, and jump is again made, and the header for the bottom part of the screen is detected and the data is read. The fractional data of the I-picture are adjoined by the image memory (buffer memory 38 in FIG. 15). The above operations are repeated until the special playback is completed. In this way, fast playback and reverse playback can be achieved.

By application of the invention, the special playback speed multiplier can be improved even in the case of an optical disk of a CLV system. This is because the data of the I-pictures is divided and fractions thereof are reproduced, while in the prior art all the I-picture data were reproduced. Note in this connection that the data capacity of an I-picture is much larger than the B- and P-pictures, and during special playback, an I-picture and then P-pictures are reproduced, or only I-pictures are reproduced successively.

Embodiment 5

Figure 18A:
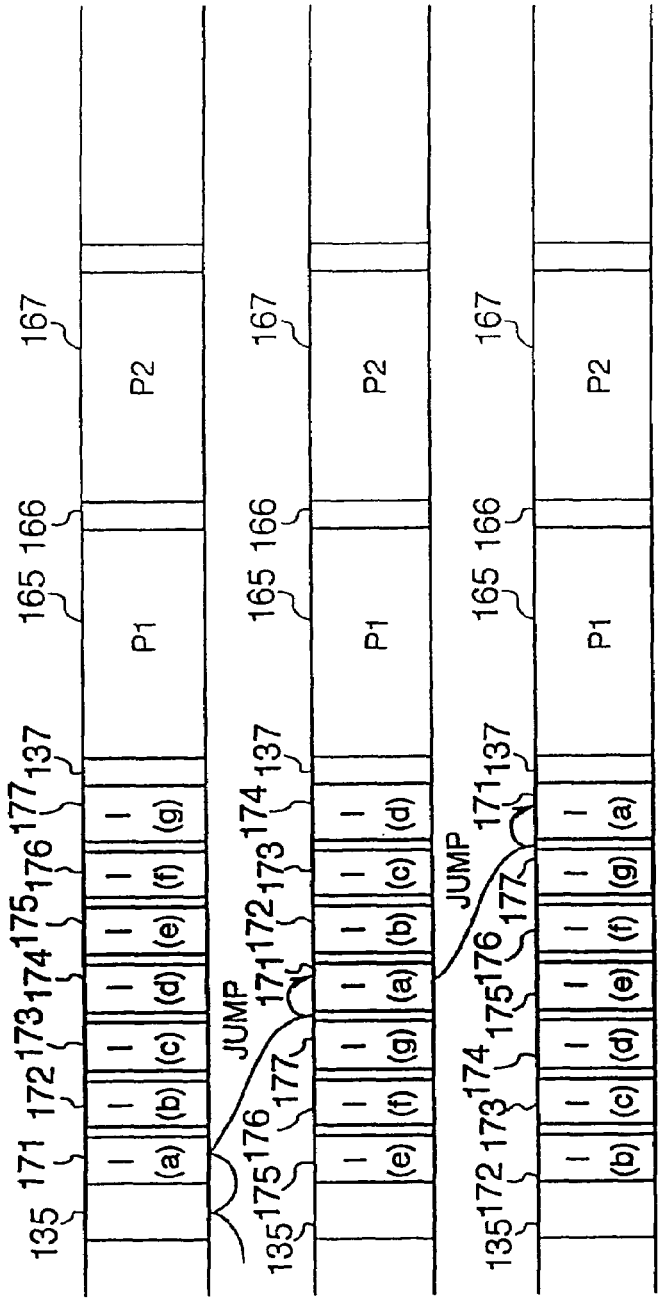
FIG. 18A shows frequency-divided I-picture data arrangement in a GOP of Embodiment 5, and the paths of track jump during playback.
Figure 18B:
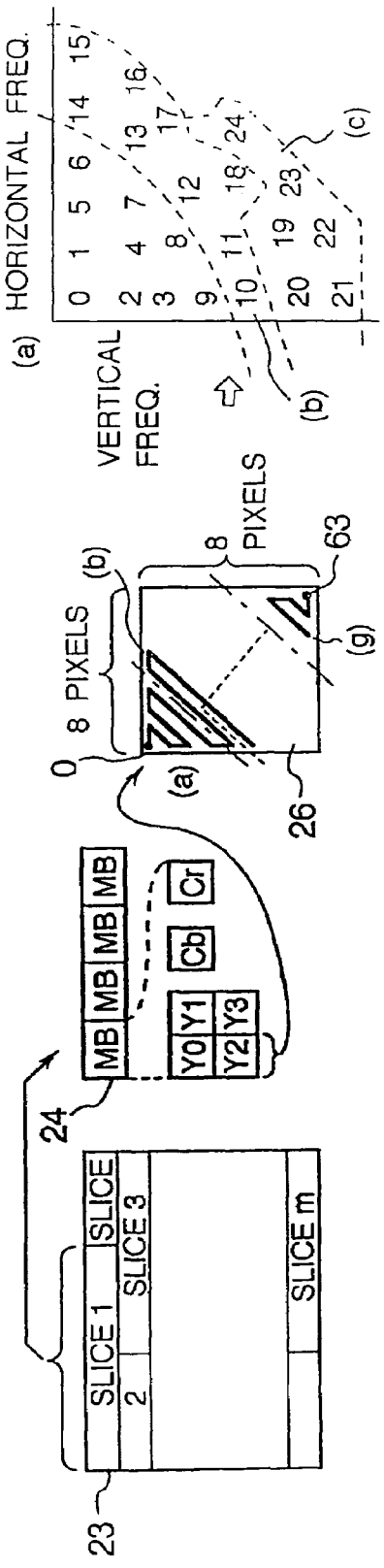
FIG. 18B shows how the frequency divide I-picture data is obtained.

FIG. 18A shows the arrangement structure of the digital motion picture image data in Embodiment 5. Reference numerals 171 to 177 denote new file blocks which are formed when the block layer 26 is of a digital motion picture image in DCT encoding is divided with reference to the spatial frequency as shown in FIG. 18B. In FIG. 18A and FIG. 18B, the file structure within an I-picture for each GOP is divided into groups of respective spatial frequency regions in DCT codes, and the disposition is altered from one GOP to another. The frequency of the respective groups is increased in the order of (a) to (g).

Figure 19:
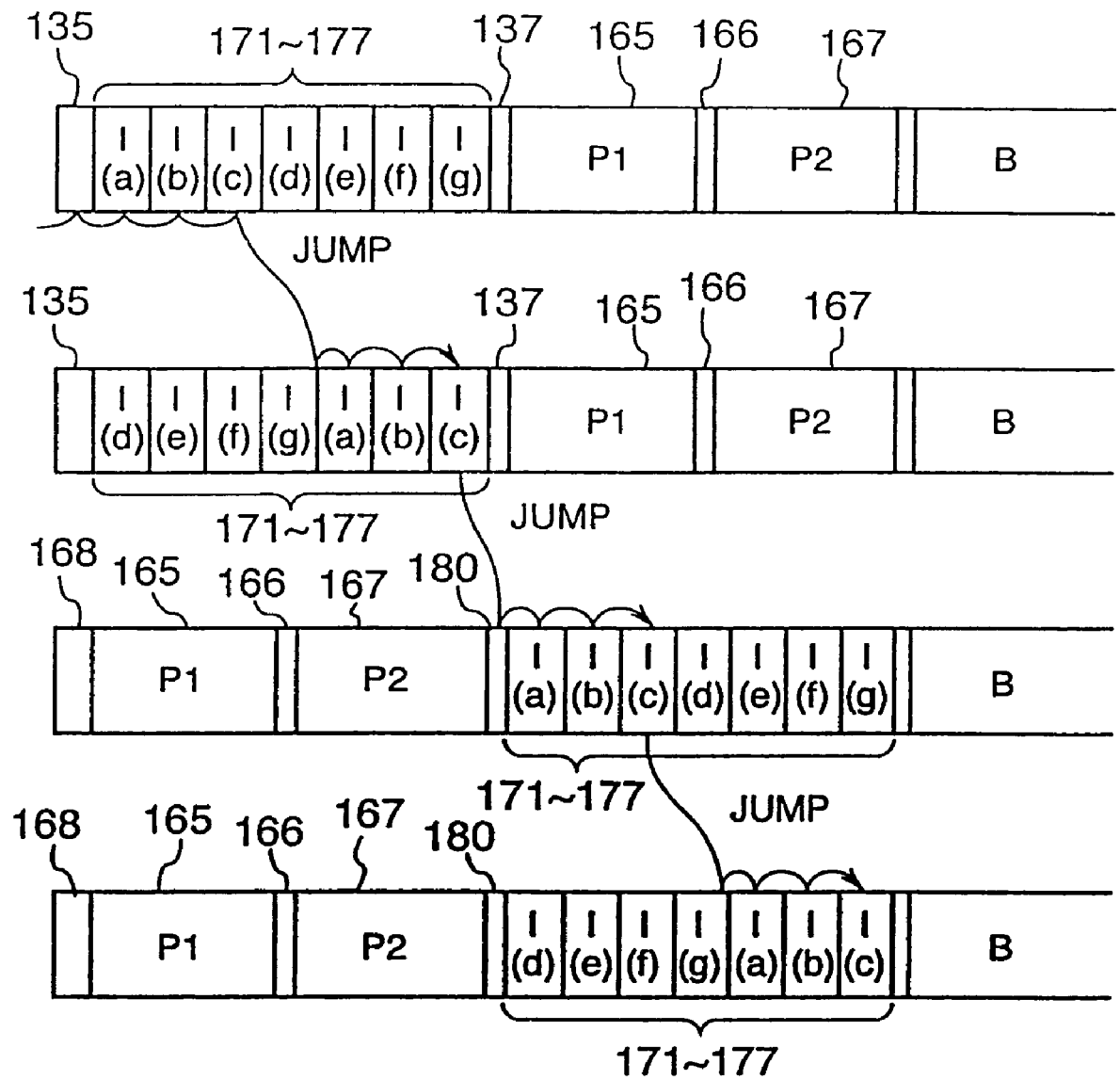
FIG. 19 shows frequency-divided I-picture data arrangement in a GOP of another example of configuration of Embodiment 5, and the paths of track jump during playback.

FIG. 19 shows a data structure which is a modification of FIG. 18A. The arrangement of I- and P-picture data is altered from one GOP to another. In the drawing, reference numeral 180 denotes an I-picture header indicating the head of the I-picture data.

Figure 20:
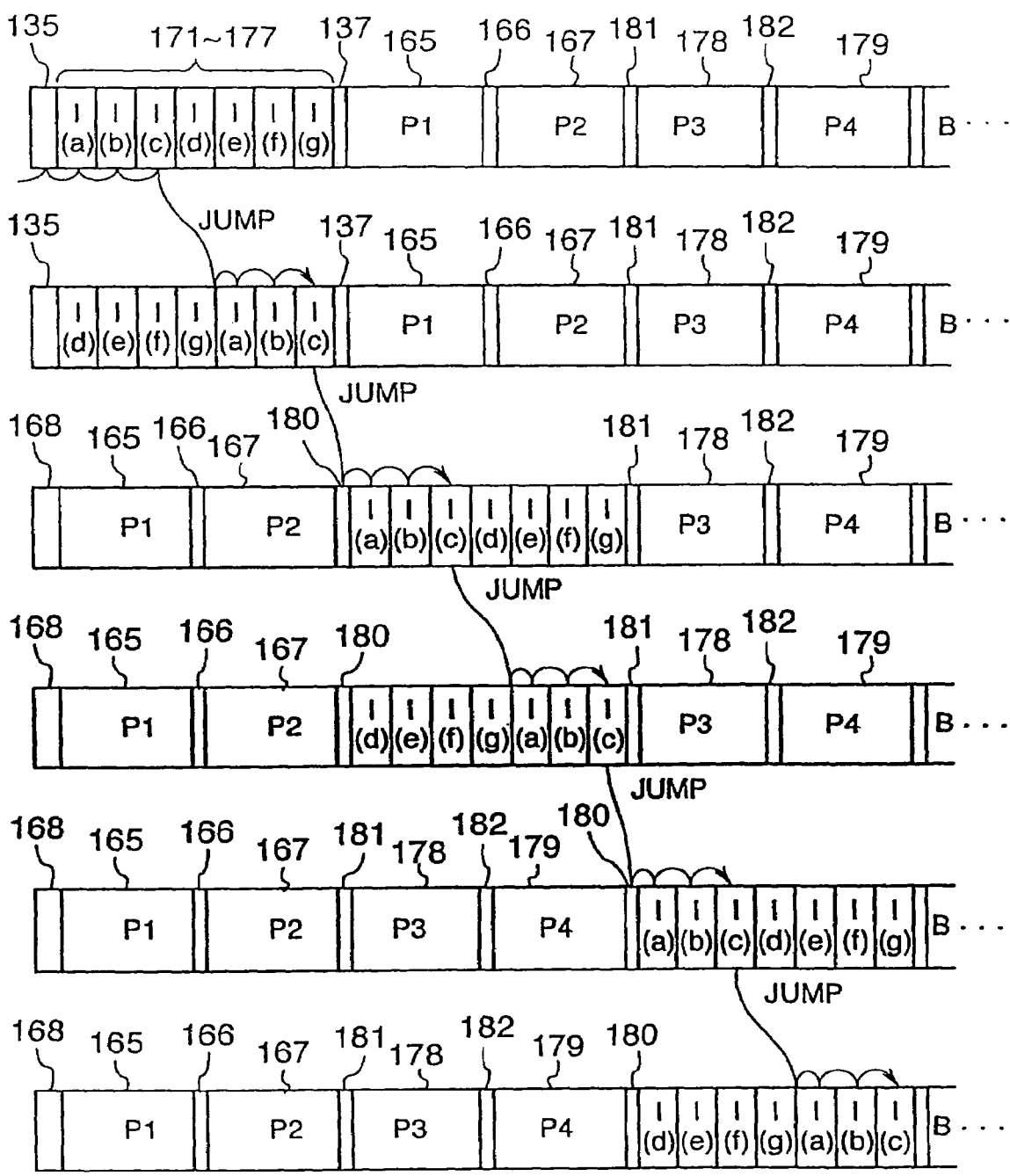
FIG. 20 shows frequency-divided I-picture data arrangement in a GOP of another example of configuration of Embodiment 5, and the paths of track jump during playback.

FIG. 20 shows an example in which each GOP has four P-pictures. Reference numeral 181 denotes a third P-picture header indicating the head of third P-picture data 178, and 182 denotes a fourth P-picture header indicating the head of fourth P-picture data 179.

Figure 21:
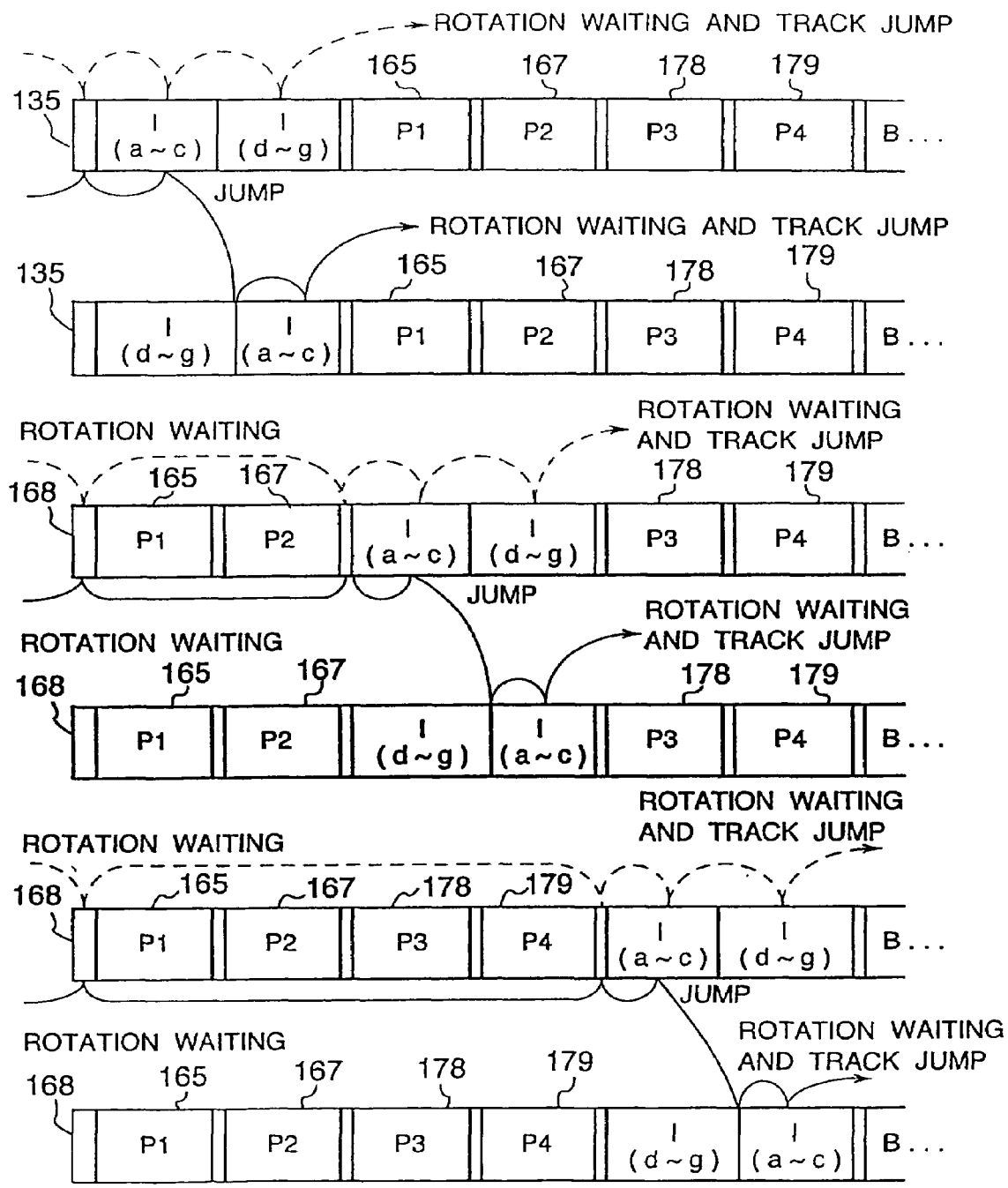
FIG. 21 shows frequency-divided I-picture data arrangement in a GOP of another example of configuration of Embodiment 5, and the paths of track jump during playback.
Figure 22:
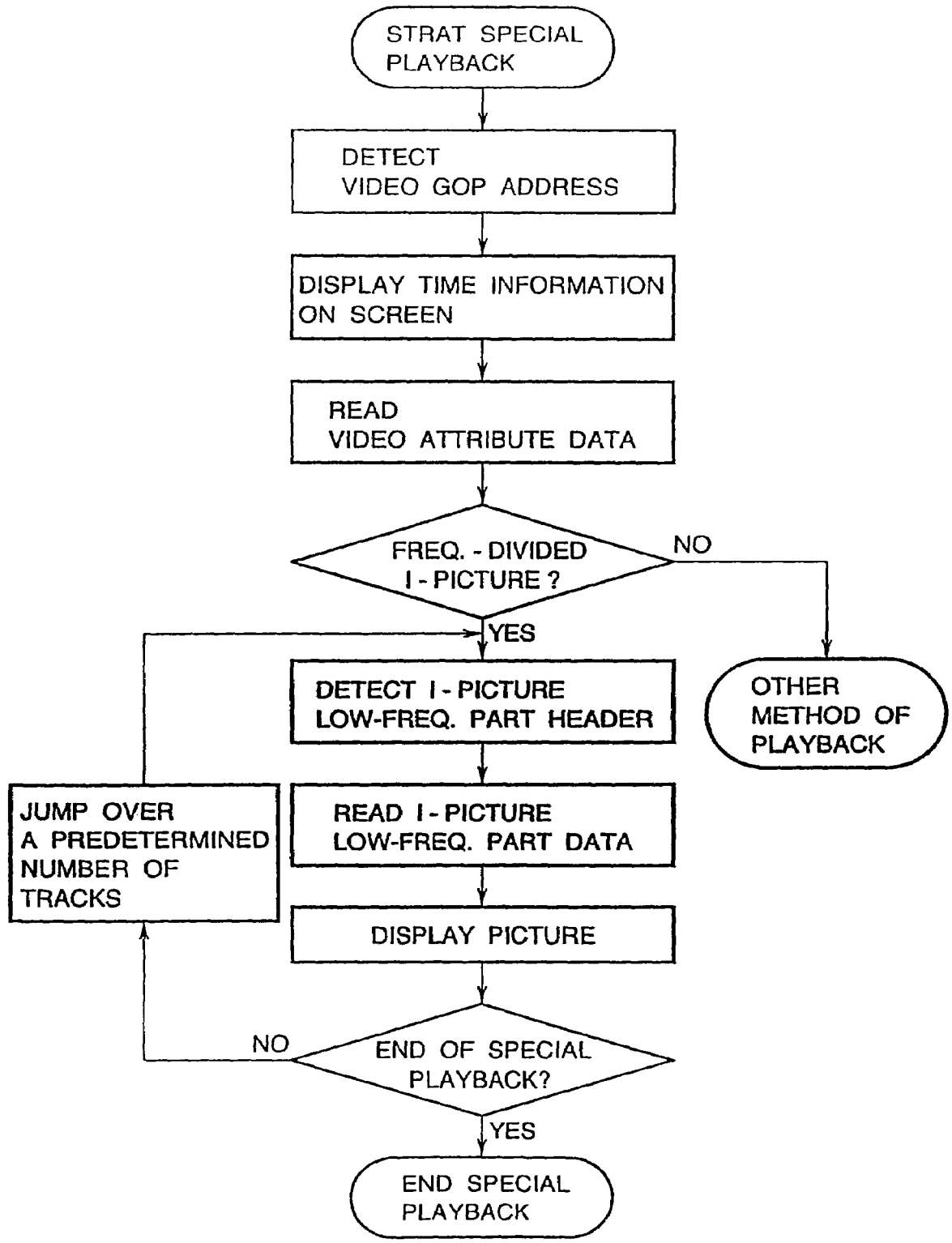
FIG. 22 is a flowchart showing the operation of Embodiment 5.

FIG. 21 shows the operation of special playback taking account of the rotation waiting with the digital motion picture image data arrangement shown in FIG. 20. FIG. 22 is a flowchart showing the operation of the optical disk drive for the case where I-picture data is divided according to the frequency.

Figure 23:
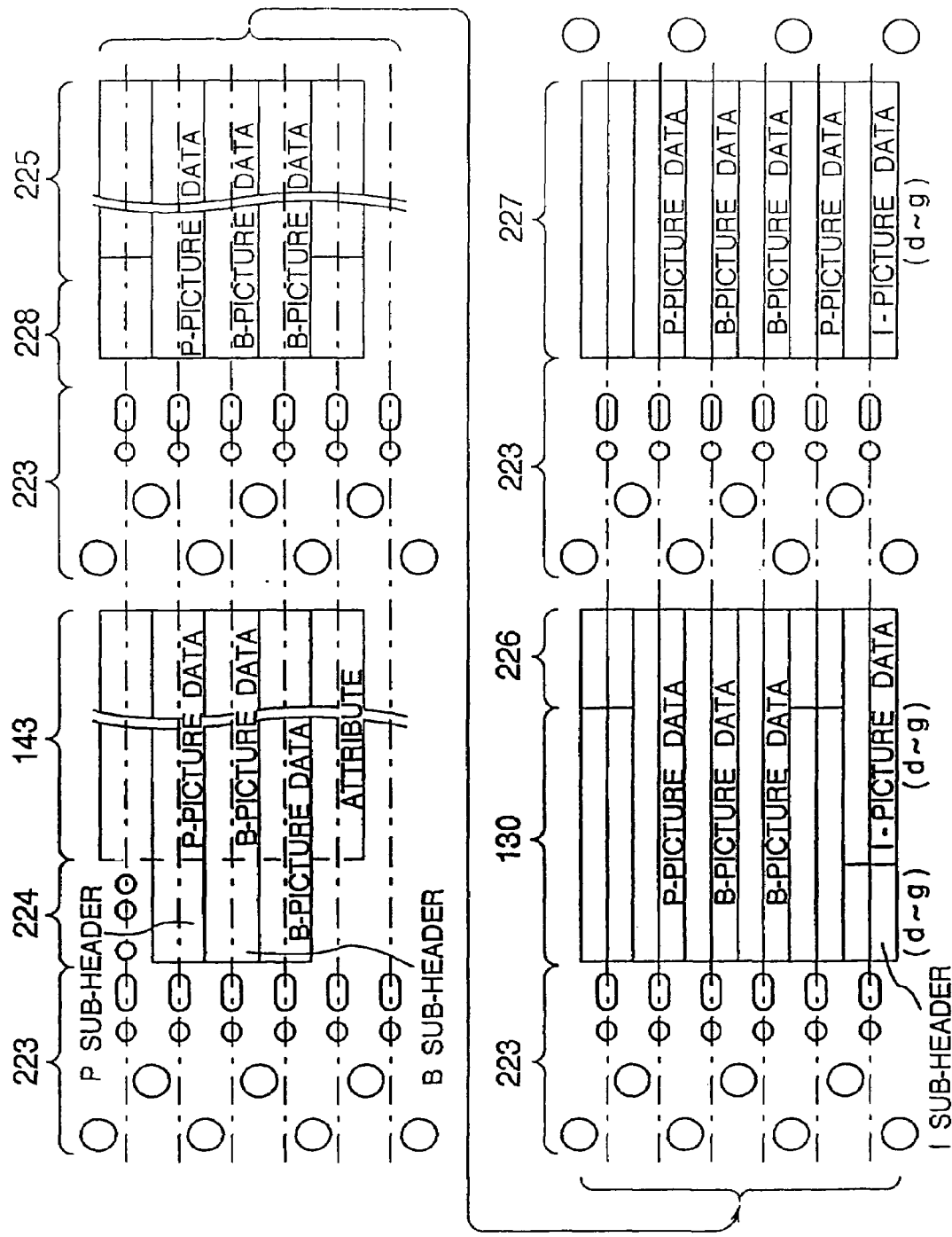
FIG. 23 shows data arrangement on an optical disk of the zone CAV type of Embodiment 5, which is preformatted in a sample-servo method.

FIG. 23 shows the data arrangement on the optical disk for the case where the optical disk of a zone CAV system is formatted according the sample servo system. In the drawing, reference numeral 223 denotes a header and servo pits, 224 denotes a sector address, 225 denotes audio data, 226 denotes a sub-header for the data block (d) to (g) in the I-picture, 227 denotes I-picture data for the (d) to (g) of the I-picture, and 228 denotes a header for the audio data.

Figure 24:
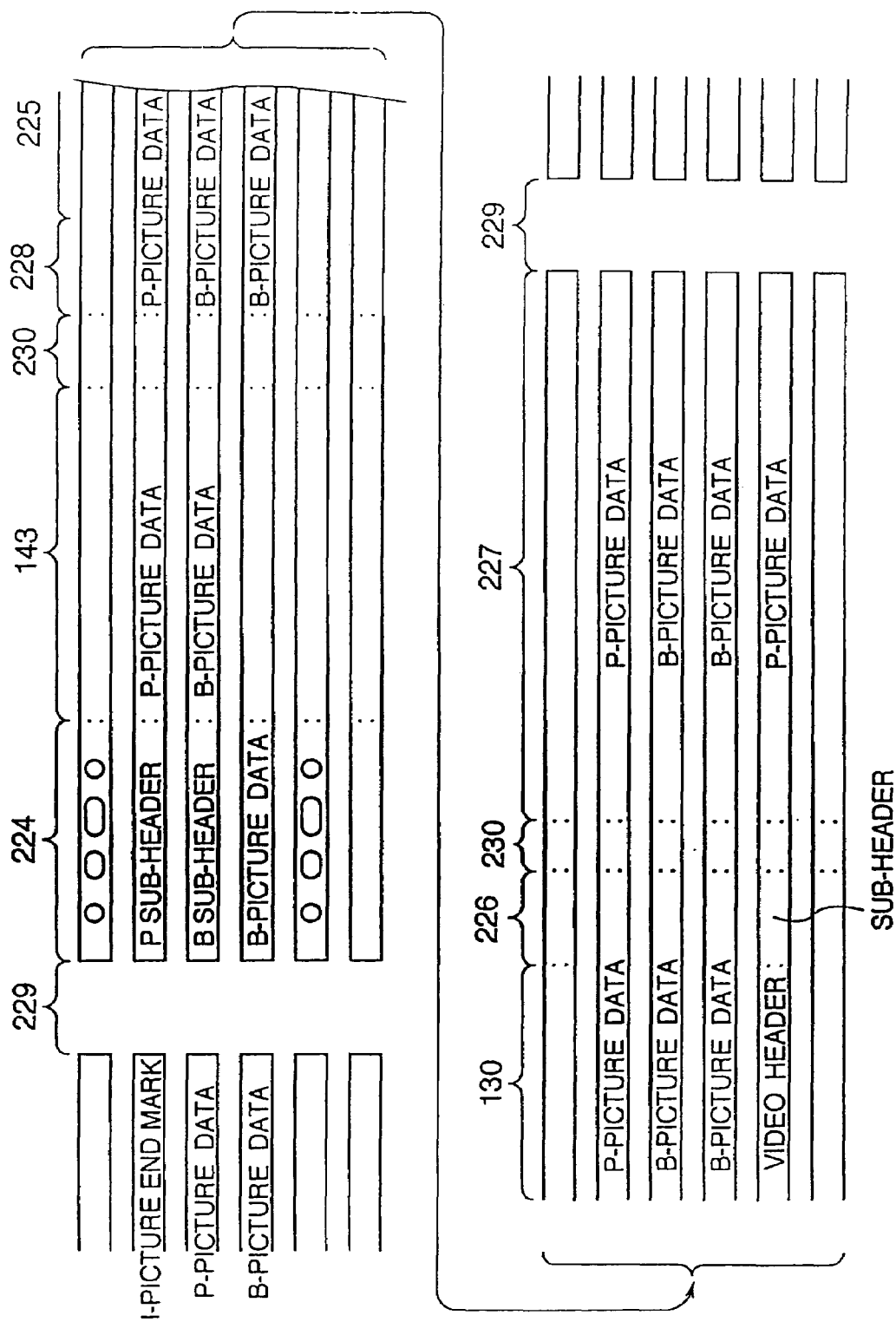
FIG. 24 shows data arrangement on an optical disk of the continuous groove type of Embodiment 5.

FIG. 24 shows the data arrangement on the optical disk for the continuous guide groove system. In the drawing, reference numeral 229 shows a mirror surface part for detecting the offset of the tracking sensor during tracking in the push-pull method, and 230 denotes a re-sync byte for the case where a modulation system having an intermittent data structure of the 2-7 modulation or 1-7 modulation is used. The re-sync byte contains a reference clock for PLL for the purpose of data detection.

The operation of Embodiment 5 will next be described. In the standard digital motion picture image compression system represented by MPEG, JPEG, and the like, the data arrangement is obtained through division according to the vertical and horizontal spatial frequencies at the time of DCT encoding of each macroblock 24, and scanning in zig-zag fashion as shown in FIG. 18B. For instance, if the 64 DCT encoding data of I-picture data are divided into blocks, seven blocks (a) to (g), each consisting of 9 or 10 DCT encoding data are formed. At the time of data recording, these I-picture data are not arranged taking each slice 23 as a unit, but are arranged taking each of the blocks (a) to (g) as a unit, as illustrated, and a header signal, a parity signal, and the like are added to the head of the block forming each of fractions generated by the division according to the frequency regions, it is possible to obtain image during special playback, by reproducing the data closer to the DC component of the DCT encoding data. In this way, it is not necessary to reproduce the entirety of each I-picture data having a relatively large data amount.

Assume, for instance, that the optical disk has the structure of the zone CAV system, and the GOP head positions are aligned in the disk radial direction. By re-arranging the data blocks (a) to (g) of an I-picture for each GOP as shown in FIG. 18A, it is possible to continuously reproduce only data block (a) in the I-picture data.

If, for instance, a signal of a rate four times that of the current standard CD (compact disk) were recorded at a double linear density on an optical disk of the current CD size (the diameter being 15 cm), the disk rotation speed would be changed from 600 rpm to 1200 rpm, and the worst rotation waiting time would be the time corresponding to three pictures.

For this reason, where one GOP is formed of 15 pictures, and if an I-picture can be read within a time for one picture (about 33 msec), it is possible to perform a 15-time speed playback in which I-pictures are successively reproduced. If a rotation waiting occurs, the time corresponding to three pictures (about 100 msec.) is wasted per revolution, and the maximum playback speed will be five time the normal speed.

If a playback system in which a next GOP is skipped and an I-picture in the next-but-one GOP is reproduced is employed, to prevent the degradation in the special playback speed multiplier, one out of 30 pictures is displayed, and at the time of 15-time speed, the same picture is displayed twice. The motion in the displayed motion picture is awkward. Moreover, a necessary scene may be missed as the skipping is increased.

To prevent the awkwardness and skipping, the amount of reproduced data of the I-picture is reduced to the extent in which image recognition is possible. That is, only the low-frequency components in the DCT encoding are reproduced, for example. Moreover, position of the low-frequency component is altered from one GOP to another. In addition, track jump is repeated. By these measures, the rotation waiting time is shortened.

Furthermore, if digital motion picture image data is recorded as shown in FIG. 19, instead of successively reproducing only the data block (a) of an I-picture data as shown in FIG. 18A, data blocks (b) and (c) of the I-picture data are also reproduced, with the result that finer image can be reproduced even in special playback. If the positions of the I- and P-pictures are exchanged, in addition to the exchange of the positions of the data blocks (a) to (c) within the I-picture data as shown in FIG. 19, the rotation waiting time in special playback is further reduced. In this case, every four GOPs form a group for which continuous data is obtained, and the fast playback is achieved by a succession of such groups each consisting of four GOPs.

Furthermore, if the number of P-pictures per GOP is four as shown in FIG. 20, every two P-pictures are made to form a group, and the positions of each group and an I-picture are exchanged to achieve fast playback in which data blocks (a) to (c) of an I-picture data are reproduced. In this case, every six GOPs form a group for which continuous data is obtained, and the fast playback is achieved by a succession of such groups each consisting of six GOPs.

Where a certain rotation waiting is permitted, and if special playback is at a several-time speed, track jump as shown in FIG. 21 is performed. If track jump is performed as indicated by dotted line, reproduction of I-pictures is affected every alternate GOPs (using data blocks (a) to (g) of every second GOP), while if track jump is performed as indicated by a solid line, reproduction of I-pictures is effected every GOP (using data blocks (a) to (c) of every GOP).

As the data arrangement within I-pictures is altered as shown in FIG. 21, the operation as indicated by the solid line is possible, and finer movement can be realized than in the case of the dotted line.

During the special playback as described above, the optical disk drive performs the operation as shown in the flowchart of FIG. 22. First, the address of the head of the GOP of the digital motion picture image data is detected, and the time information such as time code, disk address information, or the like is displayed on the screen. Then, video attribute data is read, and judgement is made as to whether the I-picture data is frequency-divided. If it is frequency-divided, the head of the low-frequency component of the I-picture is detected, and the I-picture low-frequency component is read, and a corresponding picture is displayed, and track jump over a predetermined number tracks is performed. The above operations are repeated until the completion of the special playback. In this way, the data of the low-frequency components in the DCT encoding of I-pictures is sequentially reproduced, and special playback is achieved in this way.

In an optical disk having a disk format of a sample servo system, if sectors, each formed of a part from a header and servo pits 223 to the next header and servo pits 223, as shown in FIG. 23, are aligned in a radial direction within each zone, and I-picture data, P-picture data, audio data and the like are completed over a multiple of sectors of said sample servo format, the disk structure shown in FIG. 18A to FIG. 21 is realized on the disk.

In an optical disk having a disk format of a continuous guide groove system, it is possible to adopt a file structure on the disk as shown in FIG. 24 to provide similar effects, i.e., to realize the disk structure shown in FIG. 18A to FIG. 21. In this case, a part from one mirror surface part 229 to another mirror surface part 229 form a large file unit. This large file unit can be sub-divided by re-sync byte 230 into sub-division file units, and I-picture data, P-picture data, audio data and the like are made to be of such a length which is a multiple of the sub-division file units. In this way, it is possible to realize the data structure on the disk as shown in FIG. 18A to FIG. 21.

Description has been made for the case where the optical disk is of a zone CAV format. In the case of CLV format as well, it is possible to improve the special playback speed multiplier by frequency-dividing the I-pictures.

Embodiment 6

Embodiment 6 of the invention will next be described.

Figure 25:
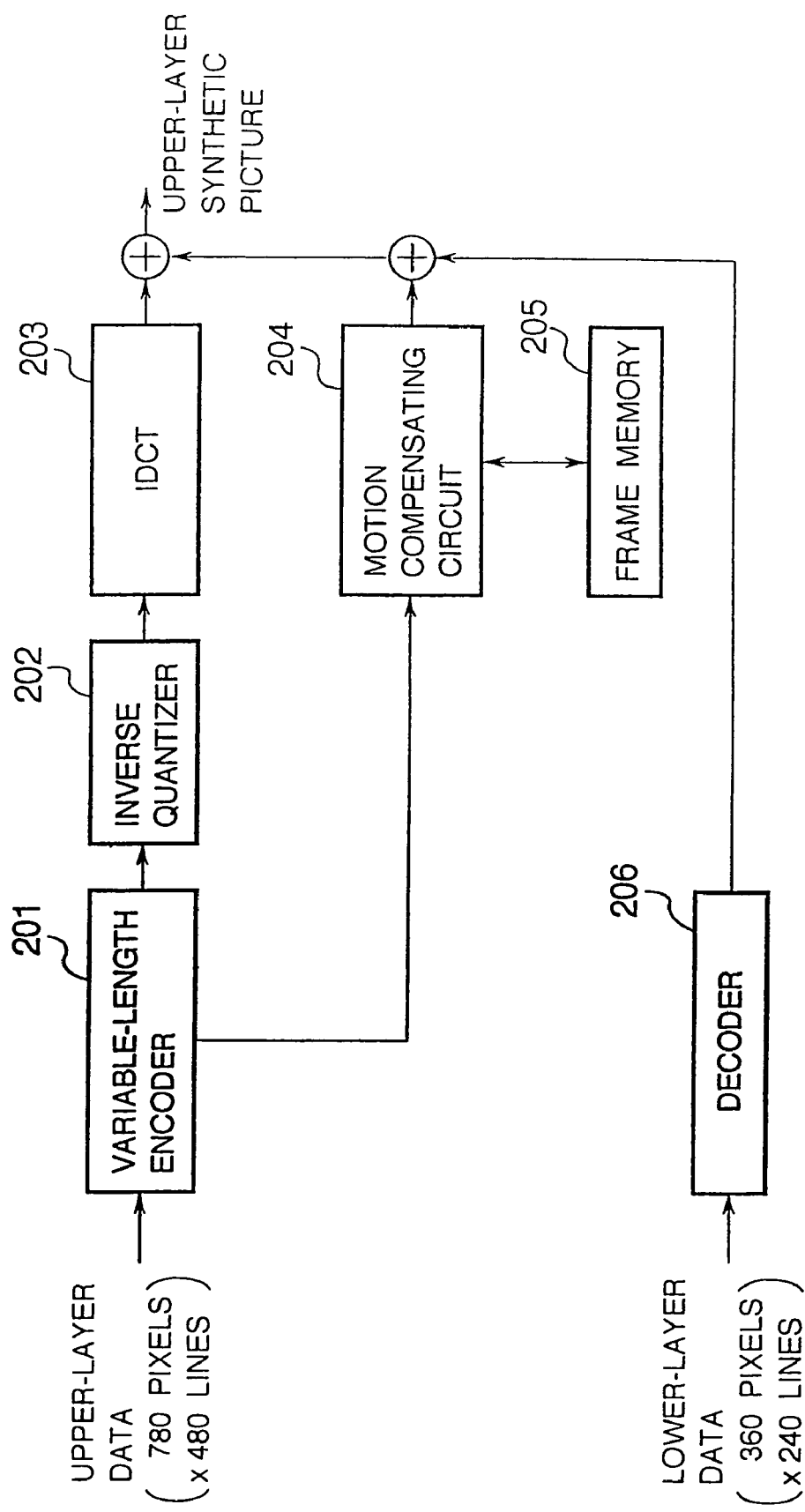
FIG. 25 is a block diagram showing an example of circuit for restoring image from the layered data of Embodiment 6.

FIG. 25 is a block diagram showing a decode circuit for restoring the image signal of 780 pixels×480 lines from a layered information, the layered information being obtained by layering digital motion picture compressed image information into compressed information corresponding to 780 pixels×480 lines, and compressed information corresponding to 360 pixels×240 lines. In the drawing, reference numeral 201 denotes a variable-length encoder, 202 denotes an inverse quantizer, 203 denotes an inverse discrete cosine transform circuit, 204 denotes a motion compensating circuit, 205 denotes a frame memory, and 206 denotes a decoder for restoring the digital motion picture compressed image data of the lower layer.

Figure 26:
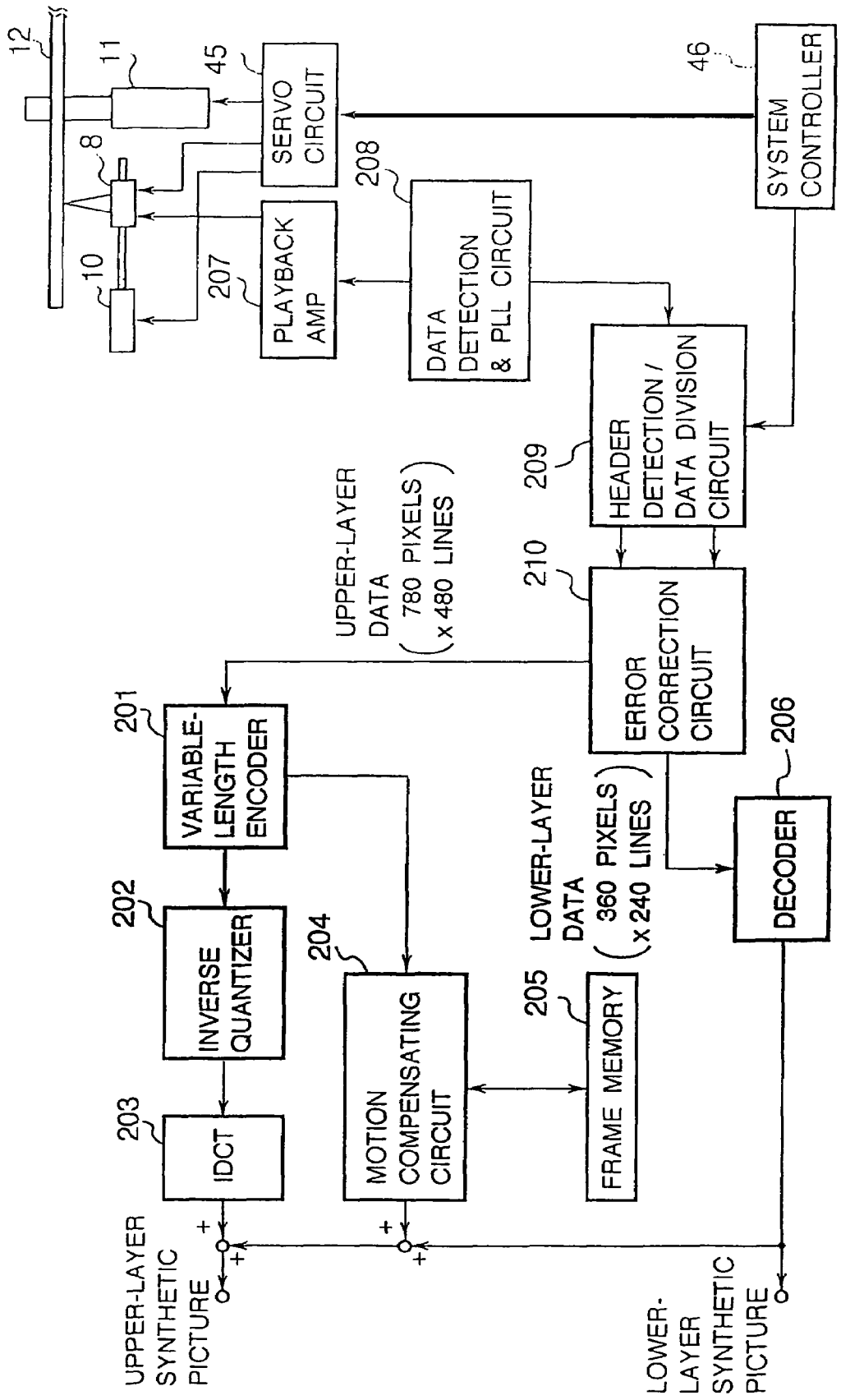
FIG. 26 is a block diagram of a digital motion picture image information playback circuit of Embodiment 6.

FIG. 26 is a block diagram showing an optical disk device for decoding the digital motion picture compressed image information recorded on the optical disk, being layered, using the decode circuit shown in FIG. 25. In the drawing, reference numeral 207 denotes a playback amplifier for reproducing digital motion picture image information recorded on the optical disk, and 208 denotes a data-detection & PLL circuit for detecting the data from the signal from the playback amplifier 207. Reference numeral 209 denotes a header detection & data discriminating circuit for detecting the header signal in the data detected by the data detection & PLL circuit 208 and discriminating the data. Reference numeral 210 denotes an error correction circuit.

Figure 27:
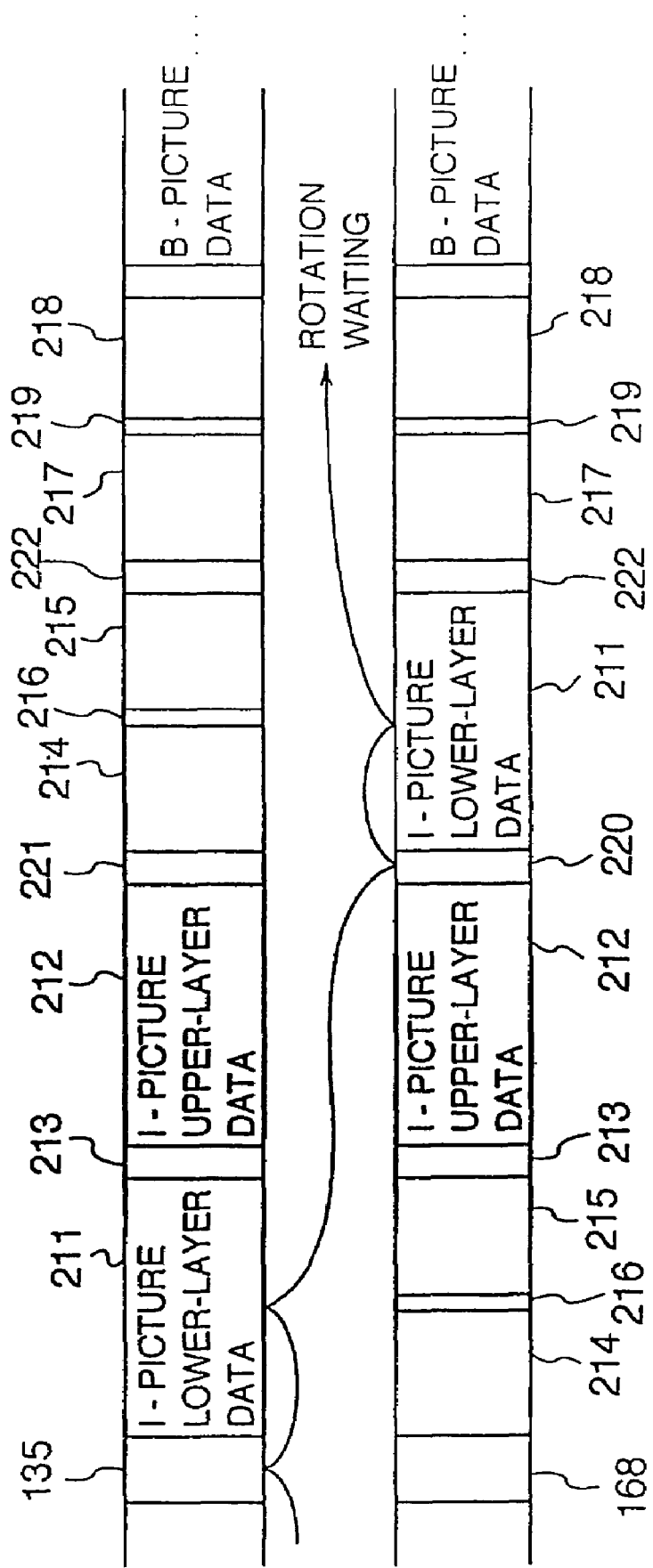
FIG. 27 shows data arrangement of I- and P-pictures in layered form according to the numbers of pixels and lines on the optical disk according to Embodiment 6.

FIG. 27 is a diagram showing the disposition of layered I- and P-picture data on the disk. Reference numeral 211 denotes a lower-layer data of an I-picture corresponding to digital motion picture image information of 360 pixels×240 lines, 212 denotes an upper-layer data of the I-picture which, in combination with the lower-layer data 211, form data of 780 pixels×480 lines, and 213 denotes a header of the upper layer data 212. Reference numeral 214 denotes a lower-layer data of a P-picture, 215 denotes an upper-layer data of the P-picture, 217 denotes a lower-layer data of a second P-picture, 218 denotes an upper-layer data of the second P-picture, 219 denotes denotes a header of the upper-layer data of the second P-picture, 220 denotes a header of the upper-layer data of the I-picture, 221 denotes a header of the upper-layer data of the first P-picture, and 222 denotes a header of the lower-layer data of the second P-picture.

Figure 28:
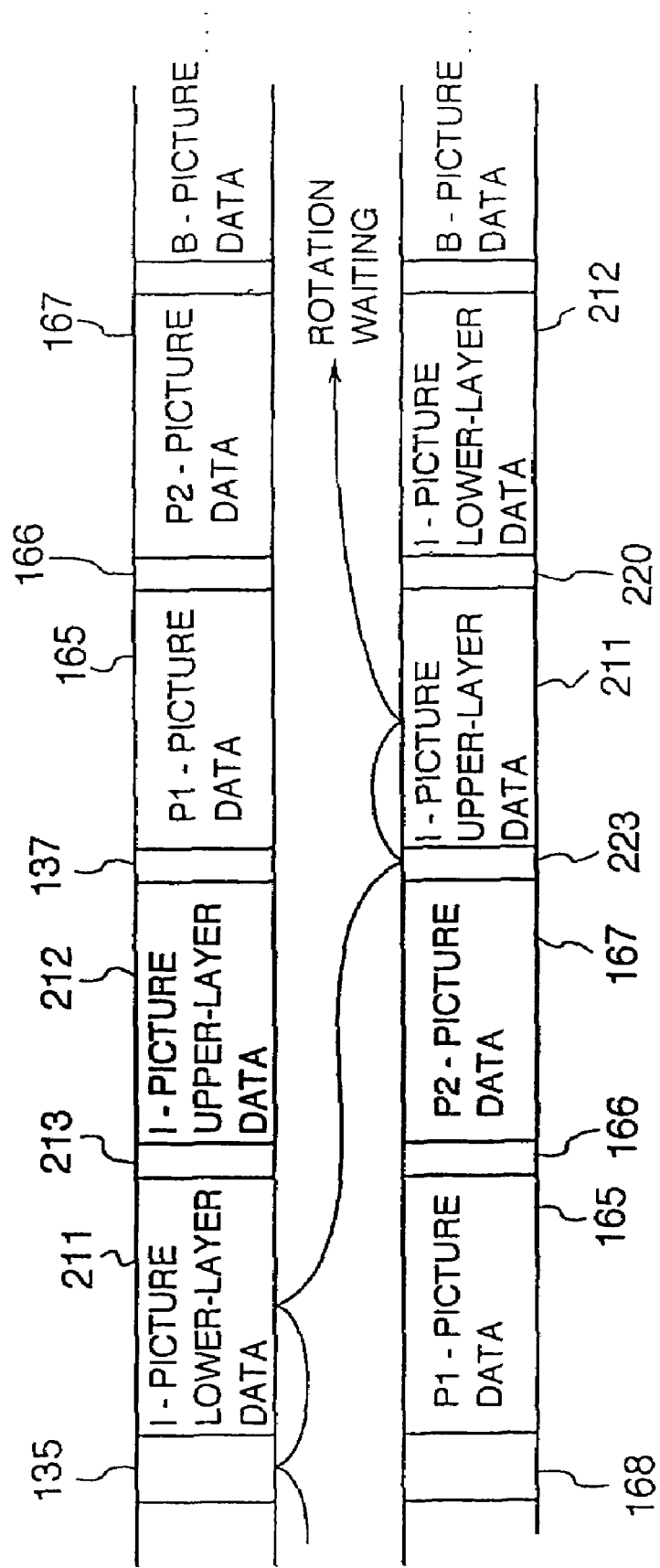
FIG. 28 shows data arrangement, with only I-pictures having been layered, on the optical disk according to Embodiment 6.
Figure 29:
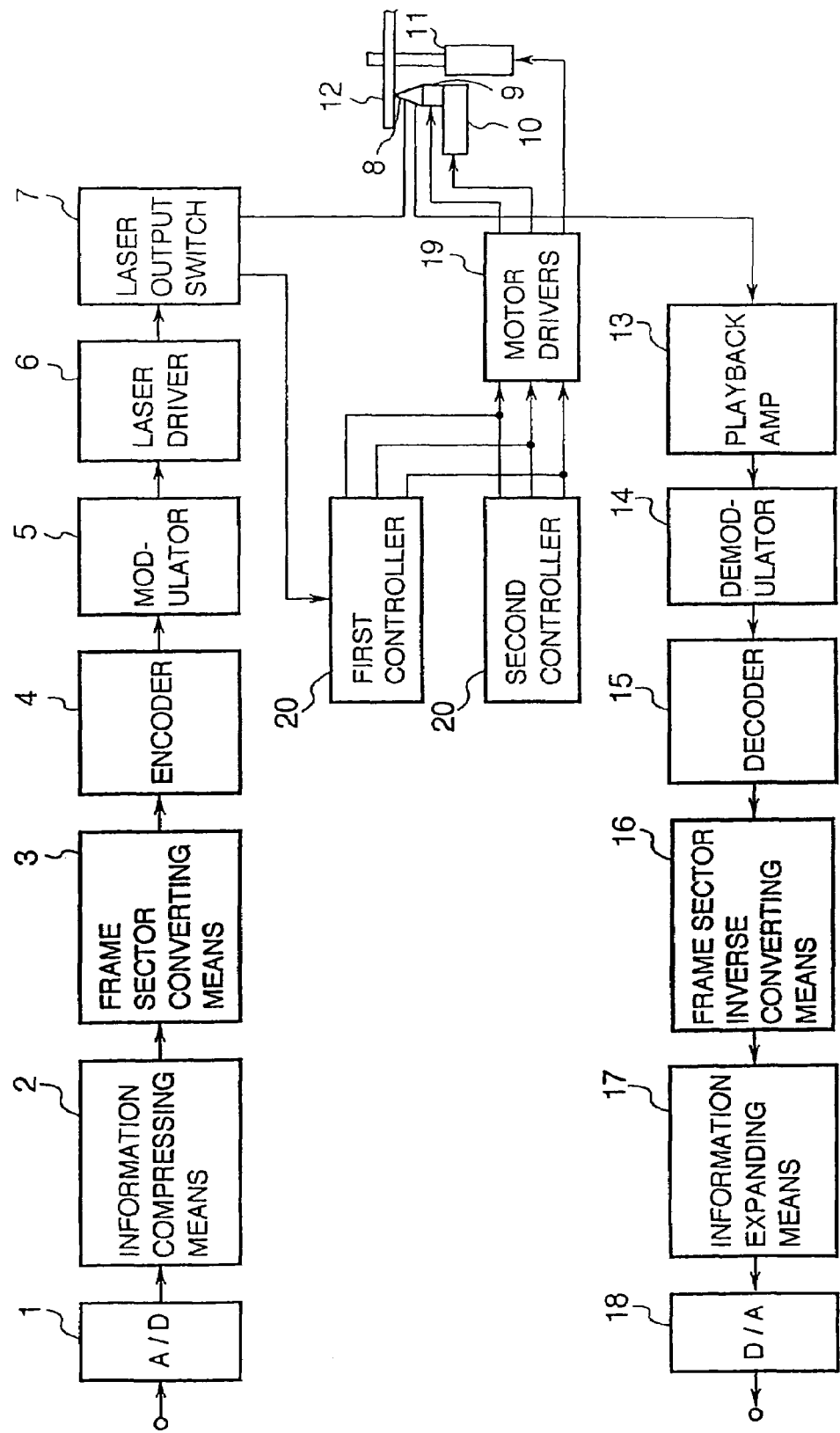
FIG. 29 is a block diagram showing the conventional optical disk recording and playback apparatus.
Figure 30:
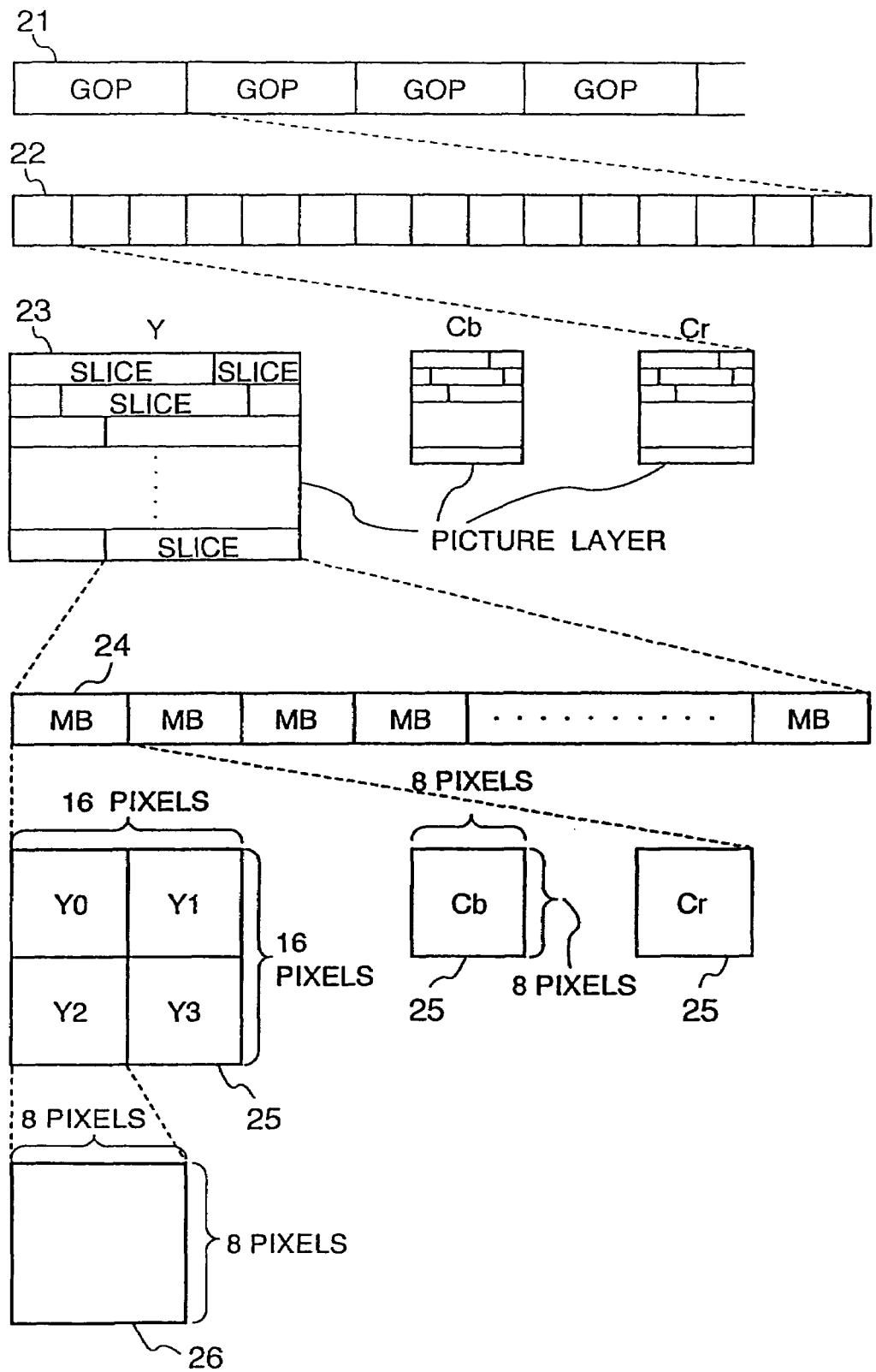
FIG. 30 is a diagram showing the data arrangement in MPEG system.

FIG. 28 shows the arrangement, on the disk, of data of which only I-picture data is layered.

The operation of Embodiment 6 will next be described

In the MPEG system is now established as an international standard, there is a method in which the data structure is layered, and divided into a lower-layer image data of 360 pixels×240 lines, and upper-layer image data which, in combination with the lower-layer image data, form data of 780 pixels×480 lines. The upper-layer data and the lower-layer data are combined at the decode circuit shown in FIG. 25 to form a synthetic picture of 780 pixels×480 lines which is a digital motion picture image information of the upper layer.

Where the I- and P-pictures are layered, the data may be arranged on the disk as shown in FIG. 27. The upper-layer and lower-layer data of the I- and P-pictures are disposed, being separated by headers and the like, and the positions of the I- and P-pictures are altered from one GOP to another. In this way, at the time of special playback, track jump is performed, and only the lower-layer data of the I-picture is continuously read.

Moreover, it is also possible to layer the I-pictures only, to thereby simplify the configuration. In this case as well, the positions of the I-picture data and P-picture data may be altered from one GOP to another, to enable continuous reading of the I-picture lower-layer data. Generally, the amount of I-picture data occupies a larger area in the GOP, so that if it is attempted to read all the data, the speed multiplier of the special playback cannot be made high. By reading only the lower-layer data of I- and P-pictures, the special playback speed multiplier can be made high, and the number of frames forming the special playback picture can be increased so as to make the motion smooth.

FIG. 26 is a block diagram showing the optical disk recording and playing back device which can restore layered data. The playback signal from the optical disk that has been amplified by the playback amplifier 207 is detected as data by the data detector 208, and divided into the upper-layer data and lower-layer data at the header detector/data discriminator 209. The discriminated data is error-corrected at the error correction circuit 210, and input into a layered-data decode circuit similar to that shown in FIG. 25, to achieve reproduction of image. With the lower-layer data alone, only the image of 360 pixels×240 lines can be obtained.

The invention being thus described, it will be obvious that the same may be varied in many ways. Such variations are not to be regarded as a departure from the spirit and scope of the invention, and all such modifications as would be obvious to one skilled in the art are intended to be included with the scope of the following claims.

The invention claimed is:

1. An optical disk, comprising:
 a plurality of recording sectors;
 a plurality of tracks, each track including a plurality of recording sectors;
 digital image information recorded on the optical disk, the digital image information having an image information block including I-picture data for intra-frame coded pictures, P-picture data for predictive coded pictures, and B-picture data for bidirectionally predictive coded pictures; and
 a video attribute data region, said video attribute data region containing picture position information which indicates a position of at least I-picture in the image information block and jump destination information which indicates a position of the next image information block;
 wherein said attribute data includes a flag indicating whether the next image information block has image data to be played back, said attribute data further indicating whether the current image information block should be played back or skipped over,
 wherein a reproducing apparatus accesses said video attribute data during playback operation and uses said video attribute information for reproducing said digital image information.

2. An apparatus for playing back video information from an optical disk, said optical disk having digital image information recorded thereon, the digital image information having an image information block including I-picture data for intra-frame coded pictures, P-picture data for predictive coded pictures, and B-picture data for bidirectionally predictive coded pictures; and
 a video attribute data region, said video attribute data region containing picture position information which indicates a position of the I-picture data in the image information block, and jump destination information which indicates a position of the next image information block, said video attribute data region further including attribute data indicating whether the current image information block should be played back or skipped over, said apparatus comprising:
 a disk motor for rotating said disk; and
 an optical head for emitting light onto said disk and receiving light reflected from said disk to reproduce information recorded thereon,
 wherein said apparatus judges whether to playback or skip over a current image information block based on said attribute data,
 wherein, upon determining to playback said current image information block, said apparatus reads at least I-picture data of the digital image information in the current image information block based on said picture position information and jumps to the next image information block in accordance with said jump destination information.

3. A method of playing back video information from an optical disk, said optical disk having digital image information recorded thereon, the digital image information having an image information block including I-picture data for intra-frame coded pictures, P-picture data for predictive coded pictures, and B-picture data for bidirectionally predictive coded pictures; and
 a video attribute data region, said video attribute data region containing picture position information, which indicates a position of the I-picture data in the image information block, and jump destination information which indicates a position of the next image information block, said video attribute data region further including attribute data indicating whether the current image information block should be played back or skipped over, said method comprising:
 reading the video attribute data;
 judging whether to playback or skip over a current image information block based on said attribute data;
 reading at least I-picture data of the digital image information in the current image information block based on said picture position information when said judging step judges that the current image information block should be played back; and jumping to the next image information block in accordance with said jump destination information.

4. A method of recording, on a optical disk, digital image information having an image information block including I-picture data for intra-frame coded pictures, P-picture data for predictive coded pictures, and B-picture data for bidirectionally predictive coded pictures, said disk including, a plurality of recording sectors, and a plurality of tracks, each track including a plurality of recording sectors, said method comprising:

disposing a video attribute data region on said disk, said video attribute data region containing picture position information, which indicates a position of at least I-picture in the image information block, and jump destination information which indicates a position of the next image information block, said video attribute data region further including attribute data indicating whether the current image information block should be played back on skipped over, wherein at least I-picture data of the digital image information in the current image information block is to be read by a playback device based on said picture position information when said attribute data indicates that the current image information block should be played back, and next image information block is to be read by the playback device in accordance with said jump destination information.

5. An apparatus for recording, on an optical disk, digital image information having an image information block including I-picture data for intra-frame coded pictures, P-picture data for predictive coded pictures, and B-picture data for bidirectionally predictive coded pictures, said disk including,
a plurality of recording sectors, and
a plurality of tracks, each track including a plurality of recording sectors, said apparatus comprising:
a unit for disposing a video attribute data region on said disk, said video attribute data region containing picture position information, which indicates a position of at least I-picture in the image information block, and jump destination information which indicates a position of the next image information block, said video attribute data region further including attribute data indicating whether the current image information block should be played back or skipped over, wherein at least I-picture data of the digital image information in the current image information block is to be read by a playback device based on said picture position information when said attribute data indicates that the current image information block should be played back, and next image information block is to be read by the playback device in accordance with said jump destination information.

6. An optical disk according to claim 1, wherein said video attribute data region is provided before said image information block.

7. An apparatus for reproducing digital video information recorded on an optical disk according to claim 1, wherein information contained in said attribute data region is used to read said digital video information.

* * * * *